United States Patent
Amro et al.

(10) Patent No.: US 11,838,330 B2
(45) Date of Patent: Dec. 5, 2023

(54) SELECTIVE INFORMATION EXTRACTION FROM NETWORK TRAFFIC TRACES BOTH ENCRYPTED AND NON-ENCRYPTED

(71) Applicant: King Fahd University of Petroleum and Minerals, Dhahran (SA)

(72) Inventors: Ahmad Amro, Dhahran (SA); Sultan Ahmad Almuhammadi, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 95 days.

(21) Appl. No.: 15/981,431

(22) Filed: May 16, 2018

(65) Prior Publication Data
US 2019/0190960 A1    Jun. 20, 2019

Related U.S. Application Data

(60) Provisional application No. 62/608,400, filed on Dec. 20, 2017.

(51) Int. Cl.
*G06F 21/60* (2013.01)
*H04L 43/04* (2022.01)
(Continued)

(52) U.S. Cl.
CPC .............. *H04L 63/30* (2013.01); *H04L 43/04* (2013.01); *H04L 43/08* (2013.01);
(Continued)

(58) Field of Classification Search
None
See application file for complete search history.

(56) References Cited

U.S. PATENT DOCUMENTS 8,135,657 B2 * 3/2012 Kapoor ................... G06F 9/505
  706/45
8,856,869 B1 * 10/2014 Brinskelle ............. H04L 63/166
  726/2

(Continued)

FOREIGN PATENT DOCUMENTS

WO    WO-2004015524 A2 *  2/2004   ......... H04L 63/0428

OTHER PUBLICATIONS

DTRAB: Combating Against Attacks on Encrypted Protocols Through Traffic-Feature Analysis. Fadlullah et al,. IEEE. (Year: 2010).*

(Continued)

*Primary Examiner* — Venkat Perungavoor
(74) *Attorney, Agent, or Firm* — Oblon, McClelland, Maier & Neustadt, L.L.P.

(57) ABSTRACT

A system and method are described for information extraction from network traffic traces that are both encrypted and non-encrypted. The system includes a client computer and a remote computer, where the client computer communicates data over a network. The client computer sets a session key log file environment variable, such that when the client computer launches a supported browser, a session key log file (KLF) is created, computer network traffic traces are captured by retrieving data from encrypted traffic, and the KLF and captured traffic are periodically transferred to a remote server. A remote computer performs traffic mining to analyze the captured traffic traces and extract sensitive pieces of information.

16 Claims, 21 Drawing Sheets

(51) Int. Cl.
*H04L 43/08* (2022.01)
*H04L 9/40* (2022.01)
*G06F 21/70* (2013.01)
*H04L 43/065* (2022.01)

(52) U.S. Cl.
CPC ........ *H04L 63/0464* (2013.01); *H04L 63/067* (2013.01); *H04L 63/1408* (2013.01); *H04L 63/166* (2013.01); *H04L 63/302* (2013.01); *H04L 43/065* (2013.01); *H04L 63/0414* (2013.01); *H04L 63/0428* (2013.01)

(56) References Cited

U.S. PATENT DOCUMENTS

| | | | | |
|---|---|---|---|---|
| 8,990,583 | B1 | 3/2015 | McEachron | |
| 9,003,023 | B2* | 4/2015 | Crank | H04L 63/1416 |
| | | | | 709/224 |
| 9,967,292 | B1* | 5/2018 | Higgins | H04L 63/30 |
| 10,051,001 | B1* | 8/2018 | Ashley | H04L 63/083 |
| 10,079,810 | B1* | 9/2018 | Moore | H04L 63/1416 |
| 2003/0163704 | A1* | 8/2003 | Dick | H04L 63/0428 |
| | | | | 713/178 |
| 2004/0243349 | A1* | 12/2004 | Greifeneder | H04L 63/1408 |
| | | | | 702/183 |
| 2005/0005145 | A1* | 1/2005 | Teixeira | G06F 21/606 |
| | | | | 705/64 |
| 2005/0091540 | A1* | 4/2005 | Dick | H04L 63/0428 |
| | | | | 726/4 |
| 2012/0158987 | A1* | 6/2012 | Greifeneder | H04L 63/166 |
| | | | | 709/231 |
| 2012/0173870 | A1* | 7/2012 | Reddy | H04L 63/0428 |
| | | | | 713/153 |
| 2012/0314584 | A1* | 12/2012 | Su | H04L 69/22 |
| | | | | 370/241 |
| 2013/0185803 | A1* | 7/2013 | Travis | G06F 21/6218 |
| | | | | 726/26 |
| 2014/0310396 | A1 | 10/2014 | Christodorescu et al. | |
| 2016/0134503 | A1* | 5/2016 | Watson | H04L 43/026 |
| | | | | 709/224 |
| 2016/0359807 | A1* | 12/2016 | Buruganahalli | H04L 63/0227 |
| 2017/0013000 | A1 | 1/2017 | El-Moussa et al. | |
| 2018/0309721 | A1* | 10/2018 | Ashley | H04L 63/06 |
| 2018/0309795 | A1* | 10/2018 | Ithal | H04L 63/1425 |

OTHER PUBLICATIONS

SIDD: A Framework for Detecting Sensitive Data Exfiltration by an Insider Attack. Liu et al. IEEE. (Year: 2009).*
Quantifying Information Leaks in Outbound Web Traffic. Borders et al. IEEE. (Year: 2009).*
Detecting and Prevent Exfilration Through Encrypted Web Sessions via Traffic Inspection. Silowash et al. S oftware Engineering Institute. (Year: 2013).*
Development of Host Based Intrusion Detection System for Log Files. Ali. IEEE. (Year: 2011).*
Digital Forensics for Eucalyptus. Zafarullah. IEEE. (Year: 2011).*
SoIDPS: Sensor Objects-Based Intrusion Detection and Prevention System and Its Implementation. Cho. Spirnger-Verlag. (Year: 2005).*
Killed by Proxy: Analyzing Client-end TLS Interception Software. Carnavalet. NDSS. (Year: 2016).*
Implementation of Security Systems for Detection and Prevention of Data Loss/Leakage at Organization via Traffic Inspection. Hassan. (Year: 2020).*
Amro, Ahmad, et al.; NetInfoMiner: High-level information extraction from network traffic; Feb. 13-16, 2017; pp. 2, 3, 4; http://ieeexplore.ieee.org/document/7881730/.
Issath, Martin, et al.; Insights into encrypted network connections: analyzing remote desktop protocol traffic; Feb. 17-19, 2016; pp. 1, 3; http://ieeexplore.ieee.org/document/7445394/.
Sherry, Justine, et al.; BlindBox Deep packet inspection over encrypted traffic; Oct. 2015; vol. 45 Issue 4, p. 2; https://eprint.iacr.org/2015/264.pdf.

* cited by examiner

```
<BrowsingSession>
<time>Wed Sep 21 13:49:12 2016 </time>
<client>192.168.1.6</client>
<browser>Chrome 53.0.2785.116</browser>
<duration>+73 s</duration>
<Clicks>
<visit_time>Wed Sep 21 13:49:12 2016 </visit_time>
<link>https://myaccount.jawwal.ps/.../Url=%2F</link>
<visit_time>Wed Sep 21 13:49:32 2016 </visit_time>
<link>https://myaccount.jawwal.ps/.../InfoPage</link>
<visit_time>Wed Sep 21 13:50:25 2016 </visit_time>
<link>https://support.f5.com/.../sol12569.html</link>
</Clicks>
</BrowsingSession>
```

FIG. 14

```
<Credential>
<Client>192.168.1.6</Client>
<Host>login.yahoo.com</Host>
<Browser>Torch 51.0.0.11603</Browser>
<LoginType>Two-Page Login</LoginType>
<DetectionType>Parameter Naming</DetectionType>
<LoginTimeUserName>DD MM dd hh:mm:ss YYYY</LoginTimeUserName>
<UsernameKey>username</UsernameKey>
<UsernameValue>*****</UsernameValue>
<LoginTimePassword>DD MM dd hh:mm:ss YYYY</LoginTimePassword>
<PasswordKey>passwd</PasswordKey>
<PasswordValue>*****</PasswordValue>
<UsageCount>1</UsageCount>
<UsageList>
<LoginTime>DD MM dd hh:mm:ss YYYY</LoginTime>
</UsageList>
</Credential>
```

FIG. 15

```
<CookieSet>
<Client>10.0.2.15</Client>
<Host>104.244.42.1</Host>
<Cookie>
<CookieFirstInitiationTime>
DD MM dd hh:mm:ss YY
</CookieFirstInitiationTime>
<CookieProperty> _twitter_sess=BAh...</CookieProperty>
<CookieProperty> Path=/</CookieProperty>
<CookieProperty> Domain=.twitter.com</CookieProperty>
<CookieProperty> Secure</CookieProperty>
<CookieProperty> HTTPOnly</CookieProperty>
</Cookie>
</CookieSet>
```

FIG. 16

| Credential Engine | | | | | |
|---|---|---|---|---|---|
| Extraction | Tested Web Applications | | | | |
| Successful | 000webhost | dailymail | ieee | nytimes | storify |
| | about.me | dailymotion | instagram | oracle | teamviewer |
| | adobe | dell | imdb | paypal | ted |
| | ahlionline | dropbox | jawwal | portal.hadara.ps | theguardian |
| | alexa | easychair | jobs.uaeu.ac.ae | reddit | tumblr |
| | amazon | ebay | kfupm-office | riders.uber | twitter |
| | aol | edas | kickstarter | sedo | vimeo |
| | apple | etsy | kooora | sharelatex | weebly |
| | arab bank | facebook | linkedin | sonyplaystation | xing |
| | bbc | flickr | live | souq | yahoo |
| | bing | forbes | login.skype | sourceforge | yelp |
| | blogger | godaddy | meetuplogin | spotfire.cloud.tibco | youtube |
| | change.org | google | myspace | stackoverflow | zdnet |
| Failed | aliexpress | booking | pinterest | tripadvisor | wikipedia |
| Total | 70 | Successful | 65 | Failed | 5 |
| | | | | Percentage | 92.86% |

FIG. 17

| Cookie Engine | | | | | |
|---|---|---|---|---|---|
| Extraction | Tested Web Applications | | | | |
| Successful | 000webhost | change.org | instagram | oracle | storify |
| | about.me | dailymail | jawwal | paypal | ted |
| | adobe | dropbox | jobs.uaeu.ac.ae | pintrest | tripadvisor |
| | ahlonline | ebay | kfupm-office | portal.hadara.ps | tumblr |
| | alexa | etsy | kooora | reddit | twitter |
| | aliexpress | facebook | linkedin | riders.uber | weebly |
| | amazon | flickr | live | sedo | wikipedia |
| | aol | godaddy | login.skype | sharelatex | yahoo |
| | arab bank | google | meetuplogin | sonyplaystation | youtube |
| | bbc | ieee | myspace | souq | zdnet |
| | blogger | imdb | nytimes | spotfire.cloud.tibco | |
| Failed | apple | dell | forbes | stackoverflow | vimeo |
| | bing | easychair | kickstarter | teamviewer | xing |
| | booking | edas | sourceforge | theguardian | yelp |
| | dailymotion | | | | |
| Total | 70 | Successful | 54 | Failed | 16 |
| | | | | Percentage | 77.14% |

FIG. 18

```
Form item: "userid" = ""          Username Parameter
Form item: "1148573049" = "*********** @gmail.com"
Form item: "runId2" = "AQABAAAAUN33LkkTxMuGsPEo1u8
Form item: "933843119" = "***************"
Form item: "pass" = ""            Password Parameter
```

FIG. 19

SELECTIVE INFORMATION EXTRACTION FROM NETWORK TRAFFIC TRACES BOTH ENCRYPTED AND NON-ENCRYPTED

CROSS-REFERENCE TO RELATED APPLICATIONS

This application claims the benefit of priority to provisional application No. 62/608,400 filed Dec. 20, 2017, the entire contents of which are incorporated herein by reference.

STATEMENT REGARDING PRIOR DISCLOSURE BY THE INVENTORS

Aspects of this technology are described in a Masters Thesis by Ahmad Amro, "Selective Information Extraction From Network Traffic Traces Both Encrypted and Non-Encrypted," January 2017; Amro, Ahmad, Almuhammadi, Sultan, and Zhioua, Sami, "NetInfoMiner: High-level information extraction from network traffic," pp. 143-150, in 2017 IEEE International Conference on Big Data and Smart Computing, Feb. 13-16, 2017, both of which are incorporated by reference in their entireties.

STATEMENT OF ACKNOWLEDGEMENT

The support provided by the Deanship of Graduate Studies at King Fahd University of Petroleum & Minerals (KFUPM), Dhahran, Saudi Arabia, is gratefully acknowledged.

BACKGROUND (1) Field of the Invention

The present disclosure relates generally to retrieval of plain-text data from network encrypted traffic, from which pieces of information can be extracted, for example, visited URLs, login credentials, session cookies, and common Facebook activities.

(2) Description of Related Art

Internet traffic carries tremendous amount of data, streaming, files, and many other resources which can be intercepted. In particular, Internet traffic contains sensitive information such as the users' visited links which most users prefer to keep private, login credentials which is, by far, the most commonly used access control mechanism used by web applications, session cookies which, when captured, may allow hijack sessions, and the high-level activities performed in social network cites, such as the social network giant "Facebook" (comments, likes, posts, etc.).

Traffic between a user and a web application (client and server) goes through a sequence of hops, including corporate gateways, routers, Internet Service providers, etc. Such setup involves a risk of eavesdropping and traffic analysis at each network hop. Uncovering specific and sensitive information from the captured traffic comes with three main challenges, namely, the huge amount of traffic, the increasing complexity of the web, and most importantly, the use of encryption. Capturing traffic of even small local networks may generate a tremendous amount of packets. Traffic flowing through ISPs may reach 40 GB per second. See W. W. W. Consortium et al., "Internet live stats", incorporated herein by reference in its entirety. Deeply analyzing such volume of data is beyond the capability of most parties.

The modern web is increasingly complex, using a variety of web technologies involving highly dynamic content, extensive use of scripting languages, dynamic visual effects, and browser plugins. Consequently, a single web page might generate a large number of requests due to the fetching of several objects, automatic and continuous update of parts of the page, and advertisement content. These requests will tend to use different and obfuscated parameter naming styles and data formats. This makes the identification of specific data elements, buried in a large number of packets, a truly challenging task. The main challenge, however, is to extract useful data from encrypted traffic.

The main protection against such traffic analysis and mining attacks is to not exchange data in plain-text. However, according to an implementation survey that covers around 140,000 of the top web applications; the traffic of more than half of the industry's top web applications faces the risk of exposure due to insecure or non-existing implementation of encryption protocols. See trustworthyinternet.org, "Trustworthy internet movement," https://www.trustworthyinternet.org/ssl-pulse/, accessed: Oct. 26, 2016, incorporated herein by reference in its entirety. For instance, while imdb.com is ranked 58th on Alexa most visited websites, it only applies encryption in the login page but not before or after, exposing users privacy (Movies and TV shows preferences and others) to any traffic sniffing attack. See Alexa.com, "imdb.com traffic statistics", incorporated herein by reference in its entirety.

BRIEF SUMMARY OF THE INVENTION

Extracting specific information from network traffic can be a tedious task. Existing techniques are either of limited functionality or work only with one type of traffic, either encrypted or not. A solution that works with both types and also provides sufficient summarizing and an easy to deal with output report is needed. In addition to that, the encrypted traffic will require the encryption keys for it to be decrypted. So, a reliable method to get these keys is also required.

Since 2016, Internet users have exceeded 3.3 billion, which directly affects the amount of traffic generated from users' interactions on the network level. See InternetWorldStats.com, "World intenet users statistics and 2015 world population stats. (n.d.)," www.internetworldstats.com/stats.htm, accessed: Jun. 30, 2016, incorporated herein by reference in its entirety. According to Cisco Visual Networking index (VNI), the amount of monthly data transferred on IP networks will reach 168 Exabyte by 2019. See C. V. N. Index, "The zettabyte era-trends and analysis," *Cisco white paper*, 2013, incorporated herein by reference in its entirety. These statistics clearly justify the validity of targeting network traffic for data mining, simply because everything is captured on the network level. Also, information extraction can benefit many applications. In digital forensics, any information may come in handy in digital investigations, including information like, visited sites, credentials, and social networks activities. Also, in web penetration testing, the session cookies provide key information required for penetration testing, getting these specific cookies from network traffic currently is not an easy and reliable option.

The main research question is "What types of interesting information can be extracted from this huge amount of data, and how to extract them", also "If the traffic is encrypted, are there reliable methods to decrypt the traffic". For example, if a party is interested in the login credentials of a client in a website, the only desired information is the username and password. The number of bytes in the traffic trace for the clients browsing session will most likely be in megabytes if not gigabytes, where the login credentials are only a few bytes for the username and the password. So, a solution to the problem of getting these few bytes out of the entire gigabytes of traffic, and a way to make the solution general so as to extract the desired information from a large set of websites for large amount of users are yet unfulfilled.

In this disclosure, the analysis of network traffic generated by four protocols, HTTP, HTTPS, HTTP2, and SPDY is targeted. The targeted network traffic is the one generated by direct browsing activities of Internet users, both plain and encrypted. However, regarding encrypted traffic, VPN traffic, TOR traffic, or any encrypted traffic other than browser based SSL/TLS encrypted traffic are not the subject of this disclosure.

Also, this disclosure targets computer devices running Windows OS. Nevertheless, all implemented tools can be modified to work with devices with Linux OS's.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 14 is a sample of the extracted browsing session;

FIG. 15 is a sample of the extracted credential;

FIG. 16 is a sample of the extracted cookie set;

FIG. 17 is a chart of the web applications used in the evaluation of the credential engine;

FIG. 18 is a chart of the web applications used in the evaluation of the cookie engine;

FIG. 19 is a sample of eBay credential parameters; and

DETAILED DESCRIPTION

Figure 1:
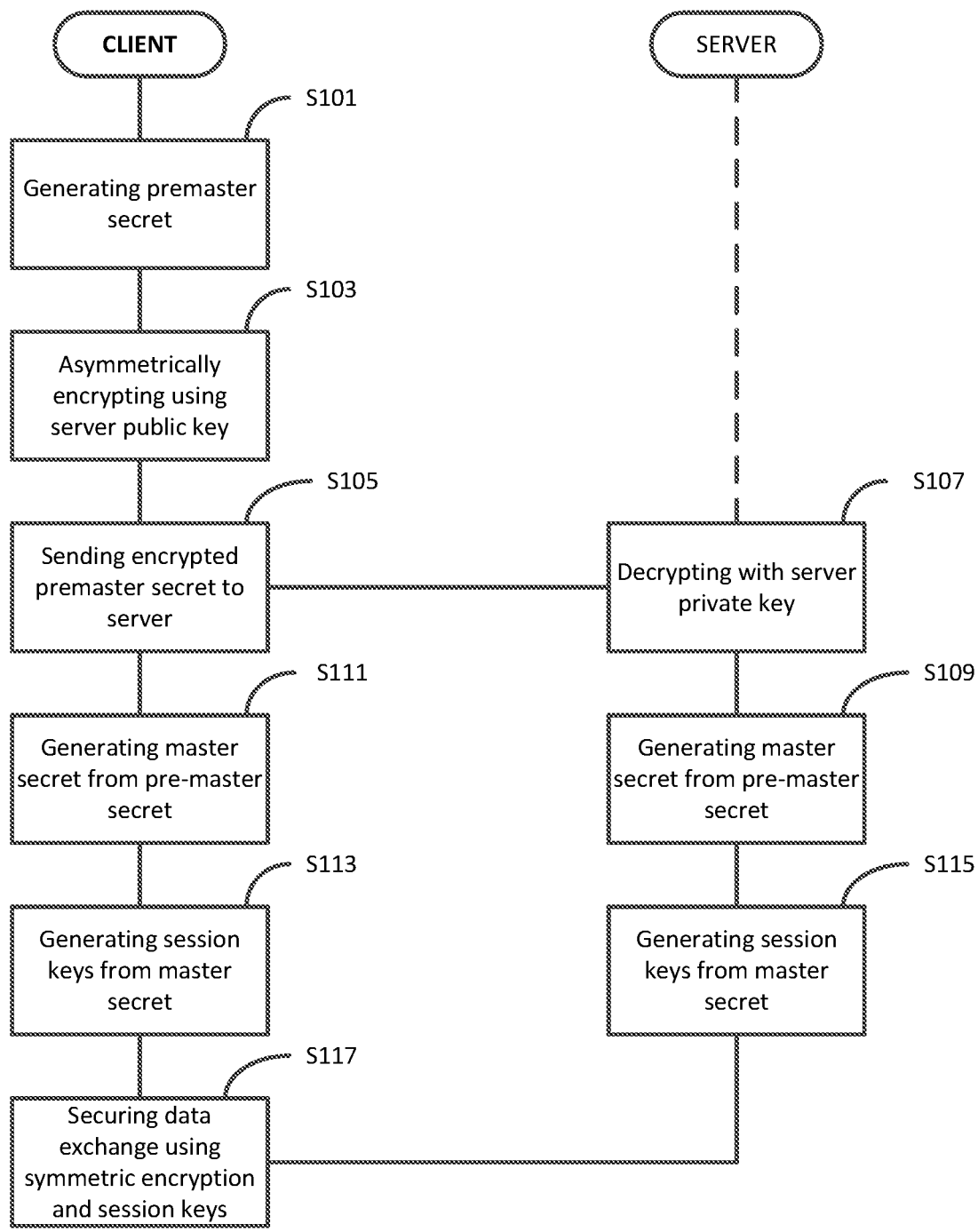
FIG. 1 is a flowchart illustrating the RSA key exchange method.

Referring now to the drawings, wherein like reference numerals designate identical or corresponding parts throughout several views, the following description relates to a system and method for information extraction from network traffic traces both encrypted and non-encrypted. The system includes a client computer that communicates data over a computer network and a remote computer. The client computer sets, if not already set, a session key log file environment variable, such that when the client computer launches a supported browser, a session key log file (KLF) is created, computer network traffic is captured by retrieving data from encrypted traffic, and the KLF and captured traffic are periodically transferred to a remote server. A remote computer performs traffic mining to analyze the captured traffic and extract sensitive pieces of information.

Data exchange between clients and servers in the World Wide Web (WWW) is carried across many protocols; some of them provide encryption as a security measure. Assuming that network traffic carries data which is exchanged using a properly implemented encryption protocol, a successful traffic analysis and mining requires the ability to decrypt past captured traffic, that is, after session termination, in addition to understanding the underlying protocol used to carry the plain traffic before encryption.

Secure Sockets Layer (SSL) and Transparent layer Security (TLS) are protocols designed to protect both the integrity and the confidentiality of connections over the network. See S. Vandeven, "Ssl/tls: What?s under the hood," SANS Institute InfoSec Reading Room, vol. 13, 2013, incorporated herein by reference in its entirety. Initially SSL 2.0 was the first version released to public in 1995. Quickly, in 1996 a complete re-design replaced SSL 2.0 into SSL 3.0. See E. Rescorla, *SSL and TLS: designing and building secure systems*. Addison-Wesley Reading, 2001, vol. 1, incorporated herein by reference in its entirety. The first version of TLS was released in 1999 based on SSL 3.0 (RFC 2246). See T. Dierks and C. Allen, "The tls protocol version 1.0," 1999, incorporated herein by reference in its entirety. Few differences between TLS 1.0 and SSL 3.0, the main one is that TLS 1.0 doesn't provide backward compatibility to some unsupported algorithms. In 2006 TLS was updated to TLS 1.1 (RFC 4346), then 1.2 in 2008 (RFC 5246). See T. Dierks and E. Rescorla, "The transport layer security protocol version 1.1," RFC 4346, April, Tech. Rep., 2006; and T. Dierks, "The transport layer security (tls) protocol version 1.2," 2008, each incorporated herein by reference in their entirety.

When a secure connection is required to be established (i.e. access an HTTPS site), the client (usually a browser application) must perform a negotiation with the server side (web application) to establish some security parameters that enables the creation of a secure connection. This negotiation is referred to as the handshake process. Two sub-protocols are the essence of TLS, the handshake and record protocols. The handshake protocol handles the establishment of common cryptographic parameters needed for encryption/decryption, in addition to server authentication and possible clients. The record protocol describes the methods for dissecting the transferred data, applying encryption and then packaging them into what is called records. This facilitates reversing the encryption and presentation of data on the other end. A detailed description of the handshake protocol is well presented in Vandeven. Mainly, the handshake process includes two methods for key negotiation: key exchange using RSA algorithm, or key generation using Diffie-Hellman (DH) algorithm. FIG. 1 is a flowchart illustrating the RSA key exchange method. In RSA, as shown in FIG. 1, in S101, the client generates a random string called "pre-master secret," which will be used to generate the cryptographic keys used for encryption/decryption by both sides. A crucial step is transferring that secret to the server without exposing it to eavesdroppers. So, in S103, the client encrypts it with the public key of the server then, in S105, sends it. This step is meant to authenticate the server, since only the desired server holds the correct private key. In S107, the correct server decrypts the pre-master secret and, in S109, S111, applies the agreed upon cryptographic algorithms to generate the symmetric encryption key called "master secret". Then, in S113, S115, the master secret is used to derive the session keys. The key point to remember regarding the RSA key exchange is that the server private key can be used, in S117 to calculate the session keys.

Figure 2:
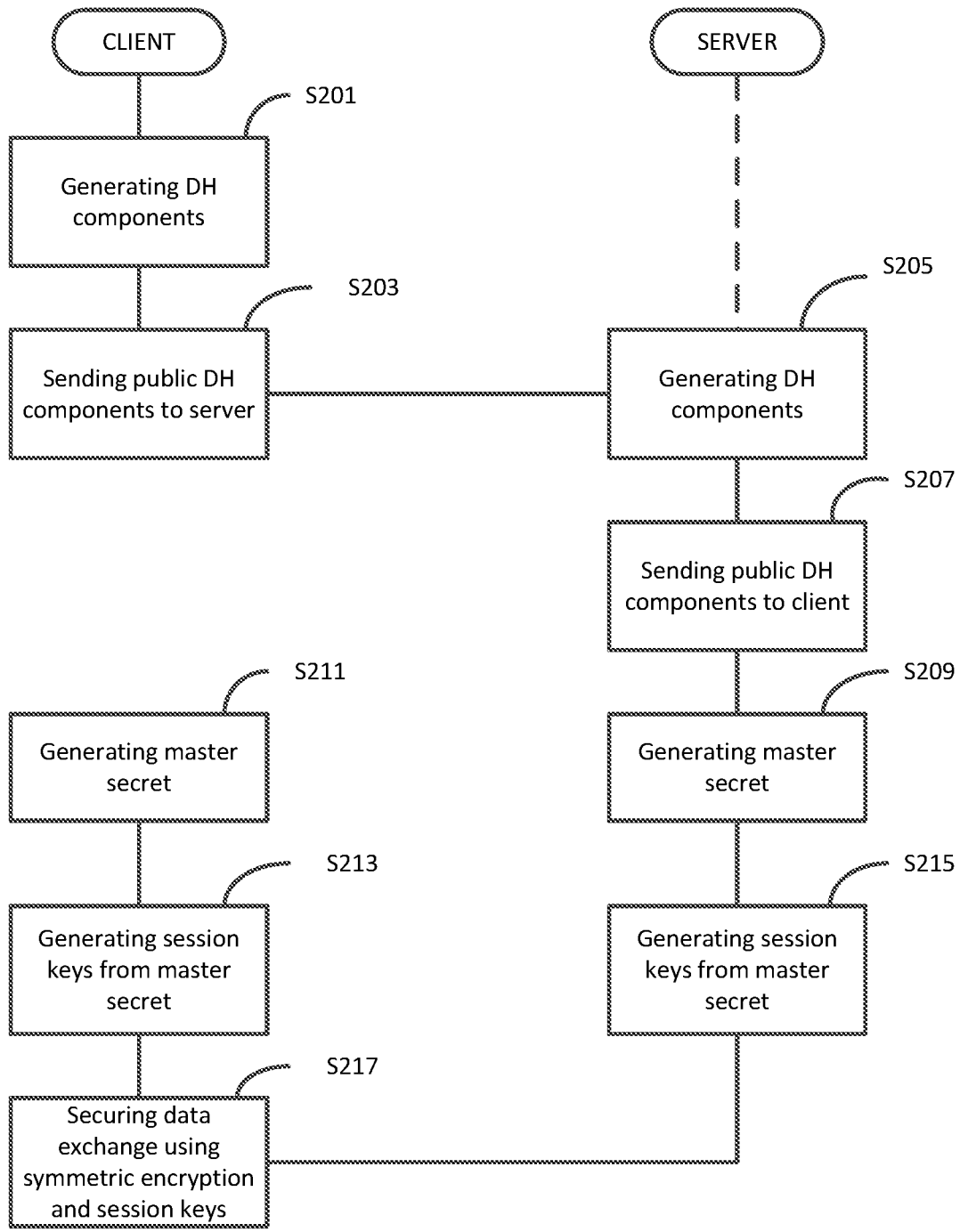
FIG. 2 is a flowchart illustrating the Diffie-Hellman key generation method.

Differently, in Diffie-Hellman (DH) key generation method, the private key of the server is not needed in the generation of the session keys. FIG. 2 is a flowchart illustrating random (ephemeral) DH components both private ones and public ones. Then, in S203, the client sends the public components to the server. On the server side, in S205, the sever components are generated and, in S207, transmitted to the client. After both sides have the required components, in S209, S211, the master secret is calculated on both sides and, in S213, S215, used to generate subsequent session keys.

When an SSL/TLS session is created, in S217, both the client and the server are able to encrypt/decrypt exchanged content using the established symmetric key (master key or session key). Assuming that a party could capture encrypted network traffic and the encryption key has been refreshed. Basically, SSL/TLS guarantees that an attacker cannot decrypt a past secure connection. This property is called Perfect Forward Secrecy (PFS) and it means that previously negotiated session keys cannot be recalculated from the client side after the session is terminated, because it requires a random (ephemeral) string and other secret components that no client is supposed to maintain. However, the private key of the server in some cases can be used to recalculate the session key, which is the case if an RSA key exchange method is used. If a Diffie-Hellman key generation method is used, the servers private key is useless in decrypting SSL/TLS sessions since it is only used to authenticate the server rather than encryption.

Conflicting with PFS, some browsers enable the use of "Session Resumption" to speed up the handshake process, this includes caching the negotiated SSL/TLS session keys in the browser memory or even logging them on disk. See J. Salowey, "Transport layer security (tls) session resumption without server-side state," Transport, 2008; and J. Kambic, "Extracting cng tls/ssl artifacts from lsass memory", each incorporated herein by reference in their entirety. Browsers accounting for almost 73% of browsers market share, including Firefox, Chrome, Opera, Torch, and other chromium based browsers can be forced to log SSL/TLS session keys to an NSS formatted key log file (KLF) on disk if the environment variable SSLKEYLOGFILE is set. See w3schools.co, "Browser statistics. (n.d.)," http://www.w3schools.com/browsers/browsers stats.asp, accessed: Apr. 20, 2016, incorporated herein by reference in its entirety. The NSS key log format is described in details in Mozilla.org. See mozilla.org, "Nss key log format. (n.d.)," https://developer.mozilla.org/en-US/docs/Mozilla/Projects/NSS/Key Log Format, accessed: Apr. 20, 2016, incorporated herein by reference in its entirety. Basically, each line in the KLF includes three columns, the first one describes the key negotiation method (RSA or non-RSA). The second column in case of RSA, holds the encoded encrypted pre-master secret, and the encoded client random for non-RSA, as either one exists in the network traffic trace. The second column is used by Wireshark to search the detected value in the network traffic with the matching value in the KLF. If a match is found, Wireshark will use the value in the third column which holds the pre-master secret (RSA) or the master secret (non-RSA) to perform the decryption using the appropriate cipher suite. This feature was meant to help analyzing encrypted SSL/TLS traffic on the client side using Wireshark.

Similarly, some digital certificate management systems provide the option for system administrators to save the server's private key into a known format called PEM. See www.digicert.com, "Creating a .pem file for ssl certificate installations. (n.d.)," https://www.digicert.com/ssl-support/pem-ssl-creation.htm, accessed: Apr. 20, 2016, incorporated herein by reference in its entirety. This key file format is also supported by Wireshark used to decrypt TLS sessions established using RSA key exchange.

There are several networking protocols used to power up web applications on the World Wide Web (WWW), the most common ones are HTTP, HTTPS, HTTP2 and SPDY.

Figure 3:
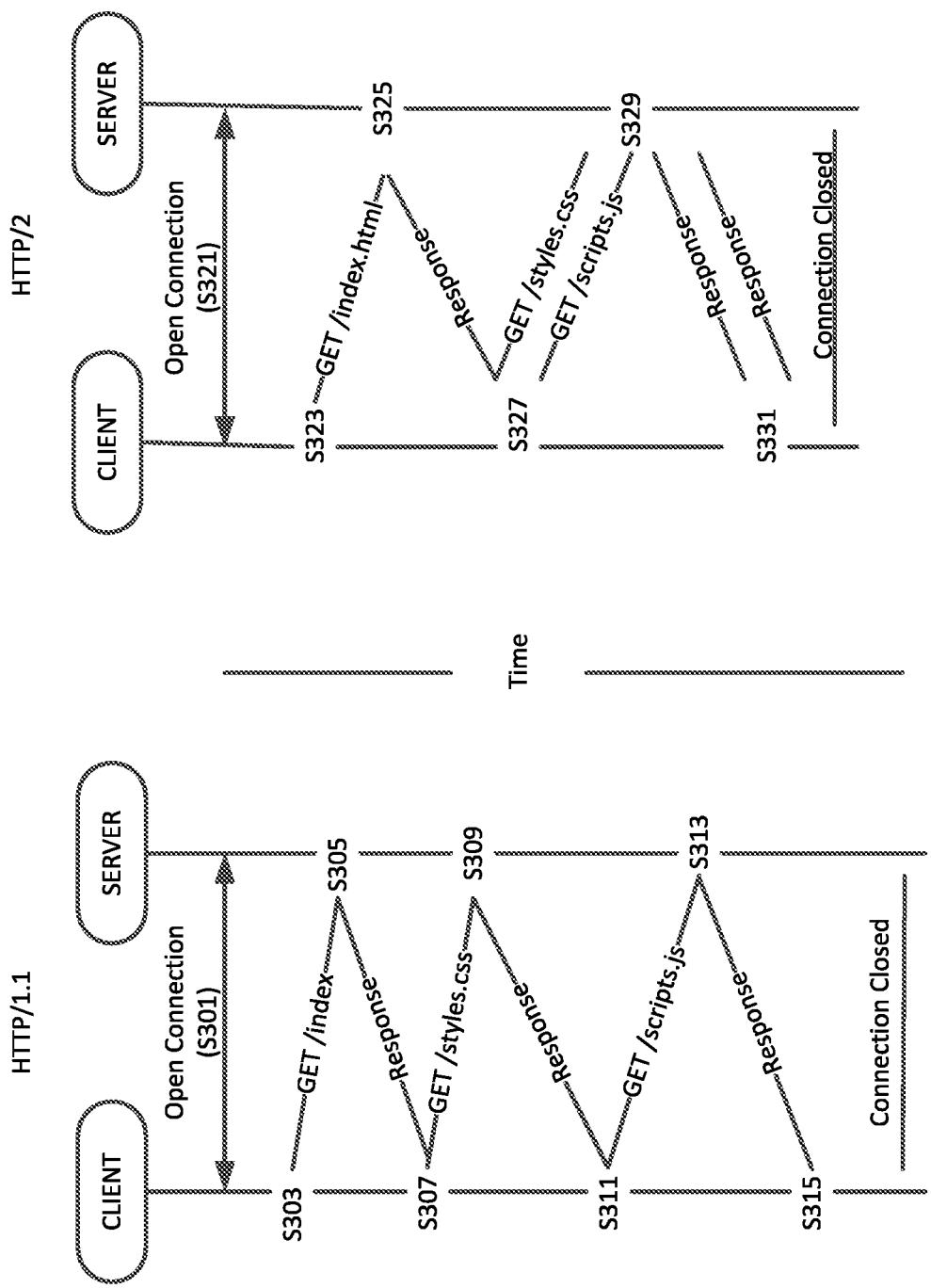
FIG. 3 is a sequence diagram that shows the main difference between HTTP and HTTP2.

Throughout this disclosure, all the described algorithms and approaches share some similarities between HTTP, HTTP2 and SPDY. So, for simplicity all of them are referred to as HTTP unless a distinguishing feature is needed. FIG. 3 is a sequence diagram that shows the main difference between HTTP and HTTP2. A brief summary for each protocol is mentioned here:

HTTP: The first version of the Hypertext Transfer Protocol (HTTP). An ASCII protocol used to exchange content (pages, images, etc.) between clients and servers. Although HTTP, specifically HTTP1.1 is still the most common negotiated protocol for carrying web content, it has suffered from known limitations, such as head of line blocking, TCP handshake latency and many others. See A. Finamore and K. Papagiannaki, "Is the web http/2 yet?" in Passive and Active Measurement: 17th International Conference, PAM 2016, Heraklion, Greece, Mar. 31-Apr. 1, 2016. Proceedings, vol. 9631. Springer, 2016, p. 218.

HTTP protocol consists of several methods and headers to carry out its functionality. HTTP methods and headers are described here:

i. GET request method S303: an HTTP method for transmitting data from the client to the server. The data is transmitted as a query string in the body of the URL request (link), meaning, a request transmitted using a GET method can be fully seen in the browser and is considered "bookmarkable".

ii. POST request method: same goal as GET method, but instead, the data sent from the client to the server is not publicly shown in the link and cannot be bookmarked by the browser. Convenient for transmitting sensitive information such as passwords.

HTTP Referer Header: a misspelling of referrer. It is a part of some HTTP requests.

It indicates the address (link) of the web resource that initiated the request.

i. HTTP Full URI: similar to the referer header, but contains the full address (link) of the requested resource. It includes the protocol name (HTTP or HTTPS), the host domain (www.X.com), the full server path to the resource (/server folder 1/server folder 2/ . . . /page.php), and the parameters sent to the resource which is called a query string(key1=value1key2=value2 . . . ).

In HTTP, in S301, a connection is established, and each request, S303, S307, S311, is followed by its response, S305, S309, S313, were requests S307, S311 and responses S309, S313 are not sent together. In S315, the connection is closed.

HTTP2 & SPDY: Google initiated the SPDY protocol (pronounced speedy) to improve both the security and the performance of HTTP. SPDY was the basis of the second version of the Hypertext Transfer Protocol (HTTP2). There are minor differences between SPDY and HTTP2, but the main methods are the same. It is important to mention two features of SPDY/HTTP2: (a) they are binary (while HTTP is textual); and (b) they multiplex several requests and responses under a single TCP connection to reduce the overhead on servers. FIG. 3 from Path clearly demonstrates the core difference between HTTP and HTTP2. See B. Patch, "Http/2 for a faster web," https://cascadingmedia.com/insites/2015/03/http-2.html, incorporated herein by reference in its entirety. In HTTP2, in S321, a connection is established, and each request, S323, S327, is followed by its response, S325, S329, making the constructing of request/response pairs from network traffic easier than HTTP were requests S307, S311 and responses S309, S313 are not paired together. In S331, the connection is closed. These features highly affect the processing of web transactions on network traffic traces. See A. Finamore and K. Papagiannaki, "Is the web http/2 yet?" in Passive and Active Measurement: 17th International Conference, PAM 2016, Heraklion, Greece, Mar. 31-Apr. 1, 2016. Proceedings, vol. 9631. Springer, 2016, p. 218, incorporated herein by reference in its entirety. Processing SPDY and HTTP2 traces requires different parsing and different concept than basic consecutive request and response protocol. Also, and since these protocols are negotiated and not fully supported by all browsers, traffic traces for retrieving the same web resource might be different from one client to another. This effect is discussed later.

HTTPS: Any secure connection to a web resource can be served over HTTPS, which is basically HTTP over SSL/TLS protocols.

This disclosure introduces a new extraction process that extracts information in SSL/TLS. Also, network traffic analysis will be used to extract information about clients. So, the related works are divided into two main streams, work related to extracting information from network traffic, and other extractions related to different types of SSL/TLS extraction.

Extracting specific information from network traffic is a well-known problem in the traffic analysis field. Notable solutions in the literature target sessions and files reconstruction. See C. Neasbitt, R. Perdisci, K. Li, and T. Nelms, "Clickminer: Towards forensic reconstruction of user-browser interactions from network traces," in *Proceedings of the* 2014 *ACM SIGSAC Conference on Computer and Communications Security*. ACM, 2014, pp. 1244-1255; and E. Hjelmvik, "Passive network security analysis with networkminer," IN) *SECURE*, no. 18, pp. 1-100, 2008, each incorporated herein by reference in its entirety. Other works focus on detecting malware downloads in the traffic. See P. Vadrevu, B. Rahbarinia, R. Perdisci, K. Li, and M. Antonakakis, "Measuring and detecting malware downloads in live network traffic," in *European Symposium on Research in Computer Security*. Springer, 2013, pp. 556-573, incorporated herein by reference in its entirety. However, unlike this work, most of existing work target non-encrypted HTTP traffic only.

ClickMiner is a solution created for forensic reconstruction of user browsing interactions from network traffic traces. It extracts the click path users followed in their browsing by applying an improved referrer-based click inference (RCI) approach initially introduced by Xie et al. See G. Xie, M. Iliofotou, T. Karagiannis, M. Faloutsos, and Y. Jin, "Resurf: Reconstructing web-surfing activity from network traffic,: in *IFIP Networking Conference*, 2013. IEEE, 2013, pp. 1-9, incorporated herein by reference in its entirety. Then, the extracted click path will be fed to a browser driver that serves these clicks using only interactions recorded in the traffic traces. NetworkMiner is a commercial tool used to extract information from network traffic. It extracts files (images, certificates, and other types), HTTP parameters, cookies and many others. The free version of the tool is of limited capabilities, it doesn't support exporting results, or command line execution for automating purposes. Although the professional version provides the previous options, still, the extracted data is not effectively filtered. For instance, the tool claims to extract the credentials, but it actually extracts all the parameters of an HTTP request and displays them, even if these parameters hold other types of information like language, location, etc. Vadrevu et al. propose AMICO, a tool that targets live web traces for detecting malware downloads. AMICO applies what is called a provenance classifier to distinguish a malware download from a benign one based on network users downloading behavior.

Another application for traffic analysis was proposed in Berger et al., where the authors claimed to successfully detect visits to criminal sites by monitoring the DNS transactions recorded on network traces. See A. Berger, A. D'Alconzo, W. N. Gansterer, and A. Pescape, "Mining agile dns traffic using graph analysis for cybercrime detection," *Computer Networks*, vol. 100, pp. 28-44, 2016, incorporated herein by reference in its entirety. The main idea behind their approach is that suspicious sites will keep changing their hosting IP address. So, the authors suggested that monitoring the relationships between the different FQDNs and the IP addresses they are hosted on will lead to detecting criminal sites.

There is some existing work that targeted encrypted traffic for information extraction. For example, in Sun et al., since web browsers do not hide all information about the encrypted traffic, for instance, HTTP object count and sizes are often revealed. See Q. Sun, D. R. Simon, Y.-M. Wang, W. Russell, V. N. Padmanabhan, and L. Qiu, "Statistical identification of encrypted web browsing traffic," in *Security and Privacy*, 2002. *Proceedings.* 2002 *IEEE Symposium on. IEEE*, 2002, pp. 19-30, incorporated herein by reference in its entirety. So, they claimed to successfully identify a significant fraction of a large sample of web pages based on these unconcealed information. But, a big problem with this approach, is that it can only identify static web content. Another work done in Bissias et al. where the authors applied a statistical approach to fingerprint application servers in an encrypted traffic. See G. D. Bissias, M. Liberatore, D. Jensen, and B. N. Levine, "Privacy vulnerabilities in encrypted http streams," *Lecture notes in computer science,* vol. 3856, p. 1, 2006, incorporated herein by reference in its entirety. In their work, the authors suggested that some features like the distributions of packet sizes and inter-arrival times when fed to a machine learning classifier, can fingerprint the target server. Similar work was performed in Alshammari et al. where the authors were able to fingerprint encrypted traffic of two applications, SSH and Skype. See R. Alshammari and A. N. Zincir-Heywood, "Machine learning based encrypted traffic classification: Identifying ssh and skype." *CISDA,* vol. 9, pp. 289-296, 2009, incorporated herein by reference in its entirety. The main idea is similar to Bissias et al. but using larger and different set of features like the packets in forward and backward direction, forward and backward packet length, etc. Also, they tested their approach using five machine learning algorithms and found that the C4.5 algorithm provides the best results. Another work in the encrypted traffic analysis track, Miller et al. describe an attack on HTTPS aiming to identify web pages in top widely used web applications with accuracy reaching 89%. See B. Miller, L. Huang, A. D. Joseph, and J. D. Tygar, "I know why you went to the clinic: risks and realization of https traffic analysis," in *International Symposium on Privacy Enhancing Technologies Symposium.* Springer, 2014, pp. 143-163, incorporated herein by reference in its entirety. Their attack applies clustering techniques to detect patterns in traffic. Then they apply a group of machine learning techniques to determine similarities and detect known web pages.

The amount and quality of information extracted by analyzing the encrypted traffic might not be enough in some cases, especially if some specific information is required, like usernames, passwords, session related cookies and visited sites.

The availability of secure services, led people all around the world to start trusting services providers with their most private contents and information (Photos, PIN codes, SSNs, etc). Such direction led to more interest on attacking the privacy that SSL/TLS protocols were intended to protect. A quick recall to the establishment of SSL/TLS sessions. When an SSL/TLS session is created, both the client and the server are able to encrypt/decrypt its content by applying the established symmetric session key (master key). This session key in no way can be recalculated from the client side after the session is terminated, because it requires a random string and other secret components that no client is supposed to maintain. On the other hand, the private key of the server in some cases can be used to recalculate the session key, which is the case if an RSA key exchange method was applied. If a Diffie-Hellman key generation method was applied, the servers private key is useless in decrypting TLS sessions since it is only used to authenticate the server rather than encryption. At last, in the establishment of an SSL/TLS session the decision to either accept or reject the servers certificate is mostly left to the client.

If attackers are interested in the content of an SSL/TLS session, they can target either one of three possible points of attack. Either acquiring the clients session key, or the servers private key or masquerading as the server by providing a fake certificate to the client hoping for the clients acceptance. An existing categorization of SSL/TLS attacks is discussed in Sheffer et al. See Y. Sheffer, R. Holz, and P. Saint-Andre, "Summarizing known attacks on transport layer security (tls) and datagram tls (dtls)," Tech. Rep., 2015, incorporated herein by reference in its entirety. A simpler categorization approach is possible, since an SSL/TLS session consists of three main elements, a client, a server, and a connection between them. Extractions can be categorized based on the three points of extraction.

The first possible point of extraction is the client. If an extractor was able to acquire a session key for some pre-recorded SSL/TLS session, that session can be decrypted. In this domain comes the disclosed extraction process. Targeting the extraction of session keys to decrypt TLS sessions is not an unusual approach. Taubmann et al. describe a solution called TLS key extractor (TLSkex) for decrypting and analyzing TLS traffic in order to detect malicious connections. See B. Taubmann, C. Fradrich, D. Dusold, and H. P. Reiser, "Tlskex: Harnessing virtual machine introspection for decrypting tls communication," *Digital Investigation,* vol. 16, pp. S114-S123, 2016, incorporated herein by reference in its entirety. TLSKex, records the network traffic of TLS sessions and simultaneously take a snapshot of certain parts of the main memory that most likely holds the calculated session key of an active TLS session. Their approach aims at extracting TLS master key from the virtual machine's main memory based on virtual machine introspection. In DefCon 2016, J. Kambic described a solution to extract SSL/TLS session keys from memory dumps as artifacts in digital forensic to decrypt TLS sessions. Both previous works are not used to attack the privacy of users but they attack the privacy TLS provides. The disclosed approach deviates from the two previously mentioned solutions by targeting the exported (KLF) from browsers rather than main memory and by targeting remote hosts rather than local VM hosts or a physically accessible machine.

The next possible point of extraction is the server, by acquiring the server's private key. This approach will not be helpful if the key exchange method provides perfect forward secrecy, which is the case when ephemeral Diffie-Hellman key generation method is performed. In contrast, this approach is helpful when RSA key exchange is followed. This was claimed to be one of the methods N.S.A. carried to obtain unrestricted access to otherwise private information. See N. Perlroth, J. Larson, and S. Shane, "Nsa able to foil basic safeguards of privacy on web: The New York Times, vol. 5, 2013, incorporated herein by reference in its entirety.

The difference between the previous two approaches is discussed next. A successful extraction on the client side will expose sensitive information of a single client when communicating with all application servers. While a successful extraction on an application server itself will expose sensitive information of all clients dealing with this server. Both client side and server side extractions can be considered as passive SSL/TLS extractions, although they require some active steps to be performed initially, but after acquiring the necessary elements, secure SSL/TLS sessions can be exposed long after the sessions were terminated. This cannot be said regarding the third extraction approach. The third family of extractions is those targeting the connection between the clients and the servers. Such extractions are known as Man-in-the-Middle (MITM) attacks. Such extractions require attackers to be actively in the middle of the connection between the client and the server. MITM attacks on TLS/SSL protocols vary by their attack nature, some of them target the cryptographic aspect of the protocol like the BEAST attack which targets a vulnerability in the CBC encryption mode, others take advantage of some weaknesses in some protocol component, for instance, the CRIME attack targets TLS compression to reveal some sensitive information such as session tokens. Another example is the TIME attack which is based on the CRIME attack model but depends on the time differences of a successful and a failed guess to recover sensitive information. The latter group of MITM based attacks are described with details in Sarkar et al. See P. G. Sarkar and S. Fitzgerald, "Attacks on ssl a comprehensive study of beast, crime, time, breach, lucky 13 & rc4 biases," *Internet: https://www.isecpartners.com/media/106031/ssl attacks survey.pdf [June,* 2014], 2013, incorporated herein by reference in its entirety. Another group of MITM attacks aim to divert victims from accessing the secure HTTPS version of a certain web application to its insecure HTTP version. This group of attacks is called downgrade attacks. An example of such attack is HTTPS downgrade with ARP poisoning or JavaScript. See W. Alcorn, C. Frichot, and M. Orru, *The Browser Hacker's Handbook.* John Wiley & Sons, 2014, incorporated herein by reference in its entirety. It is important to mention that HTTPS downgrade attacks are not considered as attack on SSL/TLS itself, but they are used to bypass the privacy that SSL/TLS offers. HTTPS downgrade attacks can be mitigated by the application of HTTP Strict Transport Security (HSTS). See J. Hodges, C. Jackson, and A. Barth, "Http strict transport security (hsts)," Tech. Rep., 2012, incorporated herein by reference in its entirety. Recently (August 2016), researchers from Microsoft reported an attack that exploits browser and operating system web proxy configuration to steal user information. See E. H. News, "Rogue proxies hijack https traffic", incorporated herein by reference in its entirety. The attack is categorized as MITM attack and requires the installation of a self-signed certificate on the victims system. The attack is deployed over email by a malicious docx file. Upon file execution, a Javascript code will launch a group of PowerShell scripts to perform attack tasks such as snooping on HTTPS traffic. This attack was investigated and it was found that it is only applicable on Windows Server 2012, Windows Server 2012 R2, and Windows 8.1. It was found also that to make it applicable for previous versions in Windows, higher privileged tasks are needed. See Reddit.com, "Powershell 4.0 but no "new-selfsignedcertificate"?" https://www.reddit.com/r/PowerShell/comments/3190yr/powershell 40_but_n_new-self-signedcertificate/, incorporated herein by reference in its entirety. The disclosed extraction model is applicable for all Windows versions that allow browsers to log session keys, in addition to Unix-based OSes.

As seen above, a wide range of MITM attacks have been proposed against SSL/TLS due to the fact that SSL/TLS protocols leave the option to either accept or reject the servers certificate to the client, which is not an easy question to be asked, especially to people with little information about the matter. An interesting point of view regarding the security of TLS is discussed in Akhawe et al. See D. Akhawe, B. Amann, M. Vallentin, and R. Sommer, "Here's my cert, so trust me, maybe?: understanding tls errors on the web," in *Proceedings of the 22nd international conference on World Wide Web.* ACM, 2013, pp. 59-70, incorporated herein by reference in its entirety. The authors discuss the browsers warning behavior and how it might affect users' judgments when asked for intervention in a real attack scenario. The authors claim that browsers send the users large amount of warnings of low level risks that make the users tend to overlook sensitive events simply because "this happens a lot".

In general, and due to the fact that MITM attacks require attackers not to only be involved in the connection between a client and a server, but also to perform some active operations during the entire TLS sessions to be able to intercept and decrypt the traffic passing through, these requirements limit the effectiveness of such attack approach compared to the other two approaches. The first limitation comes from the fact that MITM attacks in lots of cases can be detected and mitigated. A work performed in Benton et al. where the authors presented a timing analysis approach to detect MITM attacks, the approach was built on a hypothesis that a successful MITM attack sometimes requires the generation of a fake certificate which will be reflected into a noticeable time pattern in the TLS handshake stage, a pattern not existent in a normal handshake. See K. Benton and T. Bross, "Timing analysis of ssl/tls man in the middle attacks," *arXiv preprint arXiv:*1308.3559, 2013, incorporated herein by reference in its entirety. Also, in the same work, the authors suggested ways to detect the presence of three famous MITM attack tools, Ettercap, WebMiTM, and Cain & Abel. Each tool can be easily detected in a specific way relevant to its attack methodology. Similarly, known MITM attacks like BEAST, CRIME and others where mitigated with miner upgrades and patches, the same as the case of the DROWN attack, where it can be mitigated only by disabling the support for SSL v2 and updating OpenSSL to a specific newer version. See N. Aviram, S. Schinzel, J. Somorovsky, N. Heninger, M. Dankel, J. Steube, L. Valenta, D. Adrian, J. A. Halderman, V. Dukhovni et al., "Drown: Breaking tls using sslv2", incorporated herein by reference in its entirety. In addition to that, the requirement to be actively existent during active TLS sessions is not always possible, for instance, if a security incident has already happened and requires investigators to examine the encrypted traffic to extract information or evidence, in such case an active approach is useless. The last limitation can lead to describing MITM approach as Intrusive. MITM attacks will most likely leave their marks on TLS sessions. Avoiding the intrusiveness feature of any investigative approach is considered a main goal in the area of digital forensics. See J. Stüuttgen and M. Cohen, "Robust linux memory acquisition with minimal target impact," Digital Investigation, vol. 11, pp. S112-S119, 2014, incorporated herein by reference in its entirety. After understanding the limitations discussed above, targeting either end of an encrypted channel might be considered a better approach. N.S.A. for instance used to follow this approach by either hacking into clients and grabbing texts before they were encrypted in many ways (keystrokes, malware, etc.) or forcing servers to hand over their private keys and sometimes stealing them.

A description of the tools, scripting languages, and programming languages needed to accomplish the work performed is provided.

1. Wireshark (v 2.2.1): Wireshark was used to analyze the network traffic of the different protocols; a crucial step prior to implementing the mining engines. See G. Combs et al., "Wireshark," Web page: http://www.wireshark.org/last modified, pp. 12-02, 2007, incorporated herein by reference in its entirety.
2. tshark: the command-line tool of Wireshark. It was used as an interface between the mining engines and the network traffic to decrypt then extract the packets with possible desired information. It's command-line nature enabled the automation of the implemented tools.
3. editcap: a command-line tool from Wireshark. It is used to split large traffic traces into smaller ones to avoid resources limitations.
4. Windows Batch Scripting: the executive component of the implemented tools are all .bat files. See Wikibooks.org, "Windows batch scripting," https://en.wikibooks.org/wiki/WindowsBatchScripting, incorporated herein by reference in its entirety. Each file is responsible for initiating calls for tshark and pre-process its output then providing the pre-processed results to the mining engines.

5. PowerShell: a tool from Windows used to automate tasks. See B. Payette, Windows PowerShell in action. John Wiley & Sons, 2007, incorporated herein by reference in its entirety. The strong string manipulation functions provided by PowerShell was needed to perform some pre-processing of some tshark outputs.

6. Dev-C++ (v 7.51.0): all the mining engines were developed in C programming language using Dev-C++ IDE. See C. Laplace, M. Berg, H. Lai, and Y. Mandravellos, "Dev-c++ 4.9. 9.2," *Free Software Foundation Inc.,* http://www.bloodshed.net/, Cambridge, Massachusetts, USA, 1991, incorporated herein by reference in its entirety.

7. curl: a command-line tool used to initiate requests and receive responses for different protocol types, like HTTP, FTP, SMPT, and others. See curl.haxx.se, "curl: command line tool and library for transferring data with urls," https://curl.haxx.se/, incorporated herein by reference in its entirety. It was needed in the implementation of the SSLKeyExtractor software.

8. RawCap: a portable command-line tool for network traffic capture. See Netresec.com, "Rawcap network sniffer." http://www.netresec.com/?page=RawCap, incorporated herein by reference in its entirety. It was needed in the implementation of the SSLKeyExtractor software.

9. VirtualBox: a virtualization tool from Oracle. See I. VirtualBox, "The virtualbox architecture," 2008, incorporated herein by reference in its entirety. The testing virtual machine (VM) distributed among the test subjects was prepared and launched using VirtualBox.

Disclosed is a client side extraction process called DESEK (Decrypting Encrypted Sessions using Extracted Keys), the extraction process exploits a browser's feature that enables SSL/TLS session keys logging. An extractor having the session key log file can use the log file to retrieve plain-text data from SSL/TLS encrypted traffic. The traffic can then be processed by a traffic mining system to extract pieces of information, for example, the sequence of visited URLs, login credentials, session cookies, and common Facebook activities (comment, like, post, etc.). The system uses heuristics to identify obfuscated credentials in various formats. It then presents the data in a summarized and structured XML format. The DESEK extracting feature has been implemented in a user-privilege software (not requiring administrator privilege) called SSLKeyExtractor.

Figure 4:
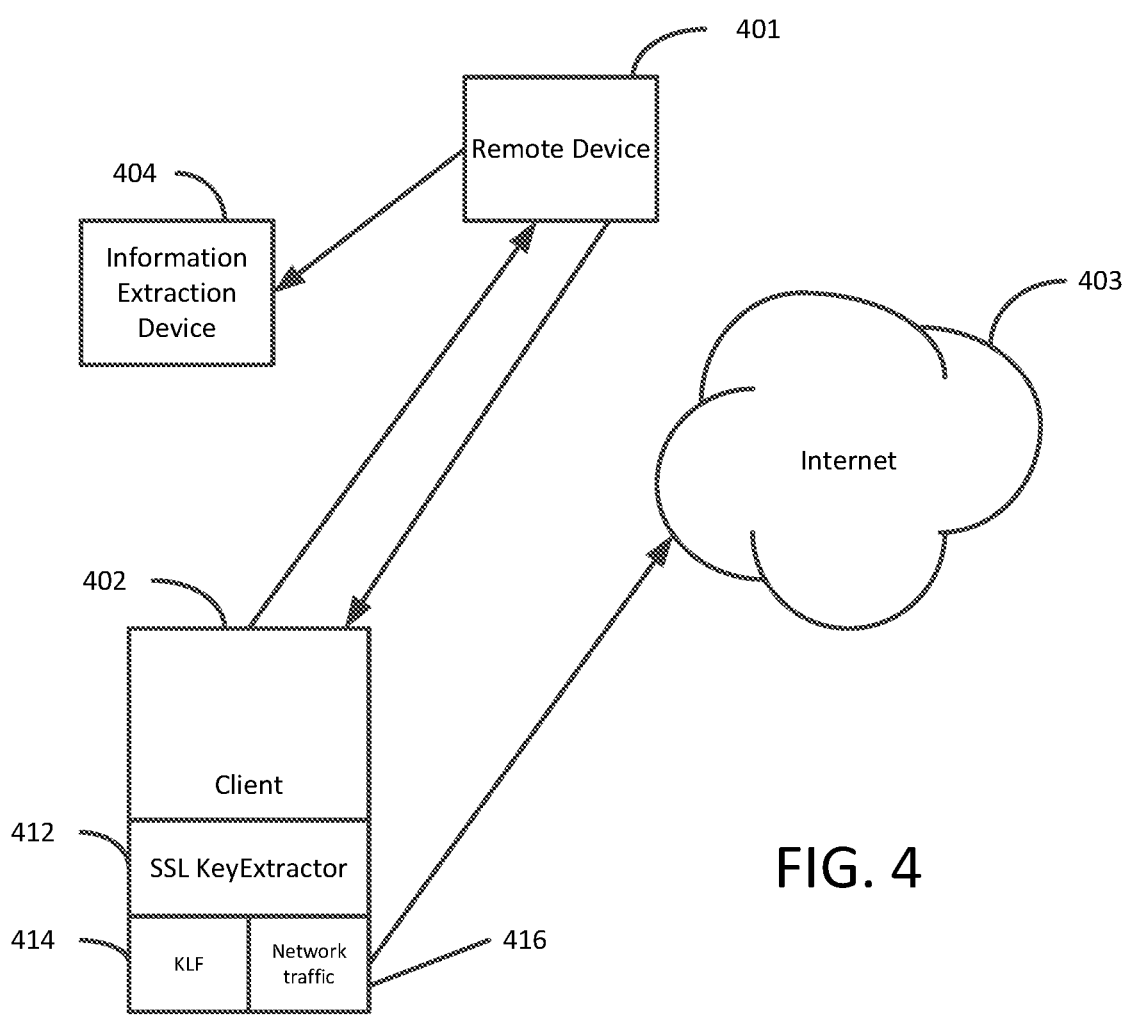
FIG. 4 is a system diagram for the DESEK Model according to an exemplary aspect of the disclosure.
Figure 5A:
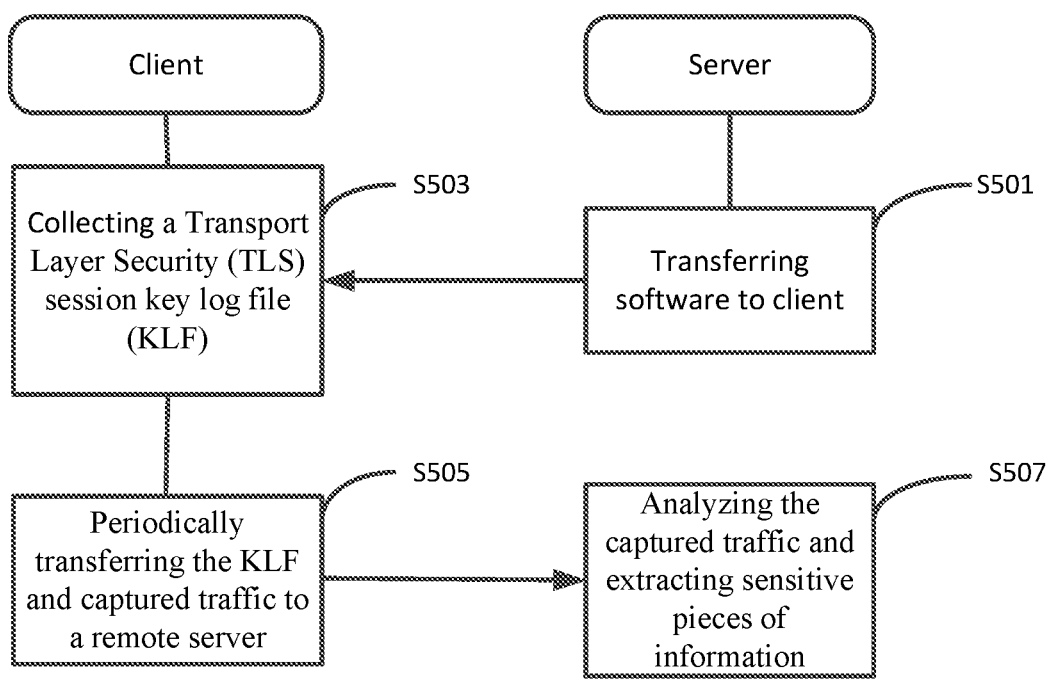
FIGS. 5A, 5B is a flowchart for the SSLKeyExtractor according to an exemplary aspect of the disclosure.
Figure 5B:
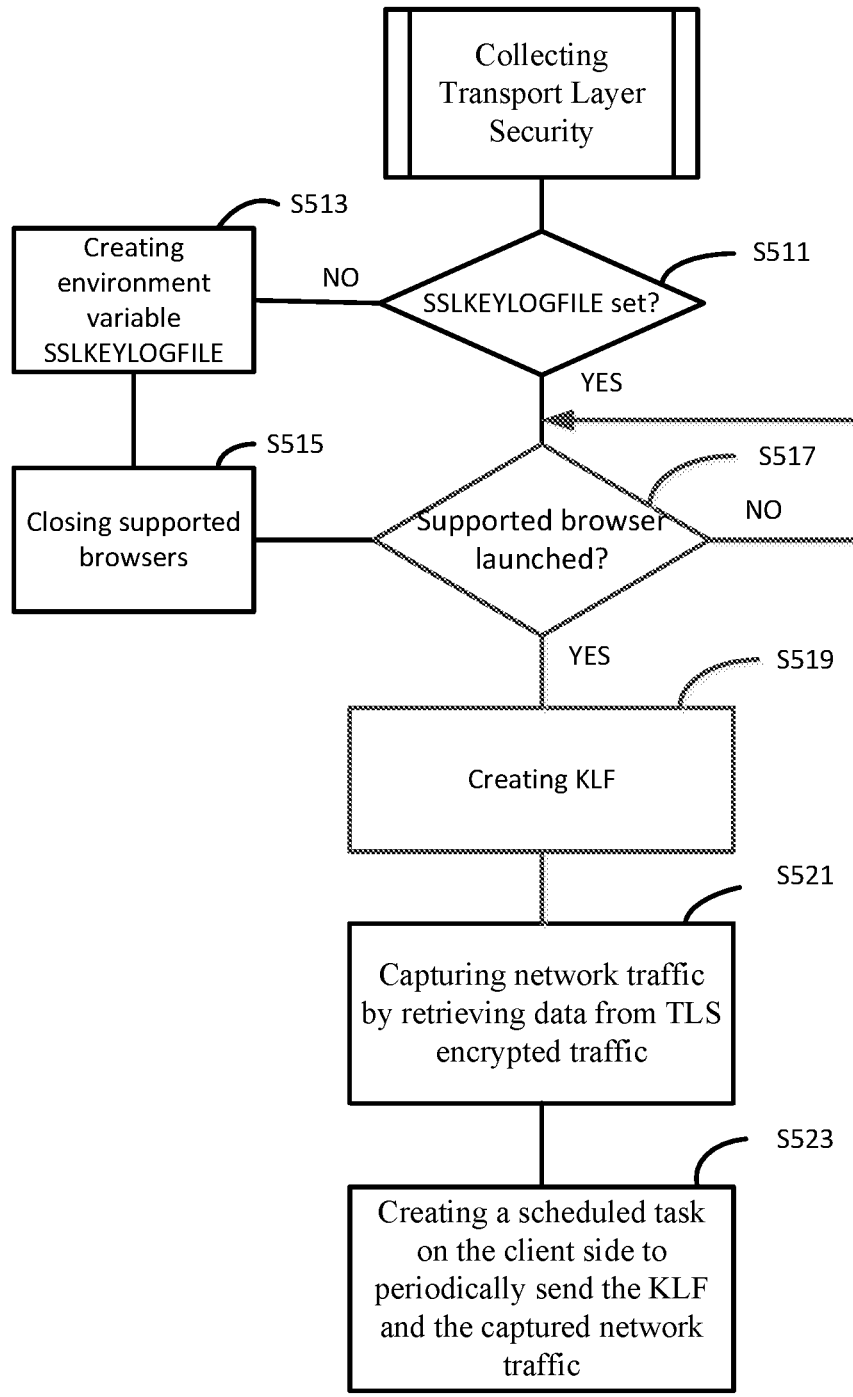

The DESEK model is shown in FIG. 4. FIGS. 5A and 5B is a flowchart for the DESEK model according to an exemplary aspect of the disclosure. Initially, in S501, a remote device 401 may send a user-privilege software called SSLKeyExtractor to a target client 402. The software can be delivered via E-mail, Drive-by download, or the like. When launched, SSLKeyExtractor 412 software performs some tasks to, in S503, collect the KLF 414 and possibly capture network traffic 416 transmitted over the Internet 403. When collected, in S505, the KLF 414 and the captured network traffic 416 are transmitted to a network traffic mining system 404, NetInfoMiner, which, in S507, decrypts the encrypted network traffic using the collected session keys. NetInfoMiner uses tshark, the command-line tool provided by Wireshark, to perform the decryption.

NetInfoMiner 404 can then extract the desired information, namely, the victim's visited links, login credentials, session cookies, and common Facebook activities. FIG. 5C and other details about NetInfoMiner are discussed later. All previous extracted information can be later used by the extractor 401 to stage further extractions such as session hijacking on the client 402.

The DESEK process may perform operations according to two scenarios: local client scenario and remote client scenario. In a local client scenario, the extractor 401 is either in the same LAN as the client 402 or has access to the network traffic in the path from the client 402 to destination web servers (Corporate router, Gateway, ISP, etc.). In a remote scenario, the extractor 401 has no direct access with the client nor to its network traffic 416. In both scenarios, the client 402 must run SSLKeyExtractor 412 which requires user privilege (no need for administrator privilege), and the remote network must allow FTP or SMTP traffic, since SSLKeyExtractor 412 will use either one to transmit the extracted elements. The only difference is the requirement to capture network traffic. In the remote scenario, SSLKeyExtractor 412 is responsible for capturing the traffic on the client's machine. This does not require higher privilege if a network sniffer tool is already pre-installed (e.g. Wireshark, Tcpdump, etc.). See V. Jacobson, C. Leres, and S. McCanne, "The tcpdump manual page," *Lawrence Berkeley Laboratory,* Berkeley, CA, 1989, incorporated herein by reference in its entirety. Otherwise, a privilege escalation becomes necessary in order to use the companion portable traffic capturing tool, namely, RawCap.

A key component in the DESEK process is the SSLKeyExtractor software 412. When launched, SSLKeyExtractor 412 performs the following tasks as shown in FIG. 5B:

1. In S511, check for an environment variable, in particular the SSLKEYLOGFILE environment variable. Its value points to the KLF.
2. If there is no such environment variable (NO in S511), in S513, create it.
3. In S515, close all the supported browsers (the ones that support the exporting of KLF).
4. If the extractor doesn't have access to network traffic, in S521, SSLKeyExtractor will initiate network traffic capture.
5. On first launch of any supported browser (YES in S517), in S519, the KLF is created.
6. In S523, create a scheduled task to periodically send the KLF as well as the traffic capture to the extractor (FTP or SMTP).

Figure 6:
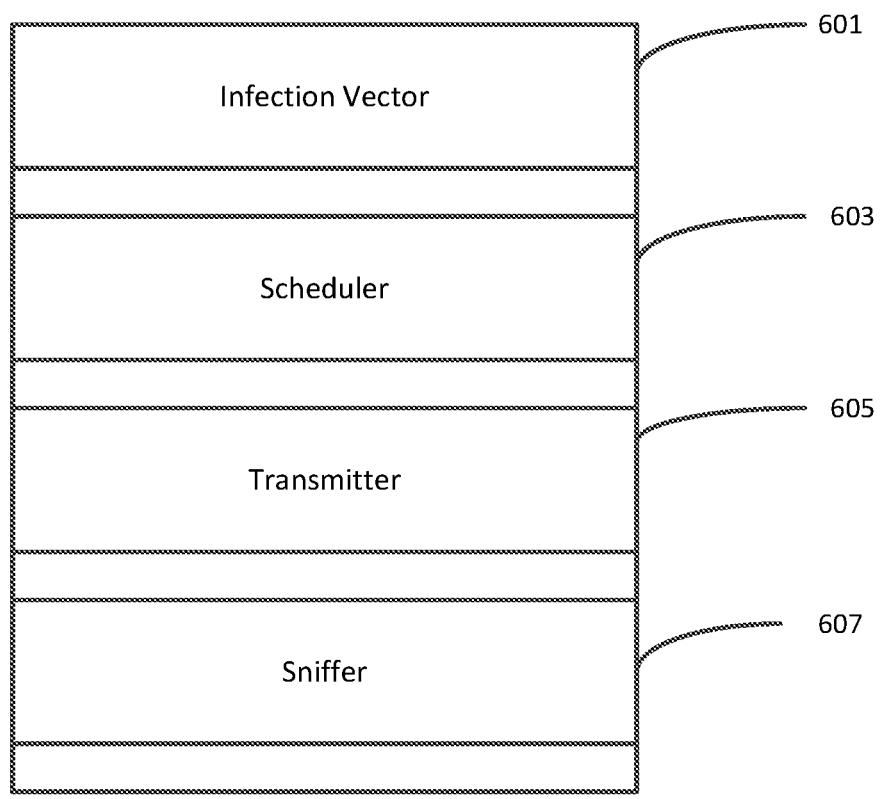
FIG. 6 is a block diagram showing main components of the SSLKeyExtractor according to an exemplary aspect of the disclosure.

The SSLKeyExtractor software may be developed using windows batch scripts. FIG. 6 is a block diagram showing main components of the SSLKeyExtractor. The SSLKeyExtractor may consist of four main components:

1. Infection vector 601: responsible for the handling of the environment variable, in particular SSLKEYLOG-FILE, and closing the supported browsers. Its functionality can be acquired using commands in a .bat script.
2. Scheduler 603: responsible for the creation of a scheduled task on the client side to periodically send the KLF and the captured network traffic. Its functionality can be acquired by initiating commands to the local "Task Scheduler" in Windows, or its equivalent in Linux. It forces the OS to create a task to launch the Transmitter script periodically.
3. Transmitter 605: responsible for the transmission of the stolen components to a remote server. Its current supported protocols are FTP and SMTP. It leverages the portable curl tool.
4. Sniffer 607: responsible for sniffing clients network traffic. If needed, the sniffer will search the client machine for an existing sniffing tool and leverage it to sniff traffic. If no sniffing tool exists, the sniffer will initiate commands to the companion RawCap sniffing tool. The later commands will require the user to accept privilege escalation.

The current implementation of SSLKeyExtractor works for Windows machines and was tested on Windows 7, 32-bit and 64-bit platforms.

As mentioned above, huge amounts of data are transferred by network traffic through different network components. The rapid increase of Internet users makes such data both available and valuable. However, extracting interesting information from network traffic is hard and tedious. It requires understanding of all the protocols responsible for communicating information over the network, and the criteria of generating the traffic. The process of extracting information becomes more challenging if the network traffic is encrypted. According to a TLS implementation survey, trustworthyinternet.org, "Trustworthy internet movement," https://www.trustworthyinternet.org/ssl-pulse/, accessed: Oct. 26, 2016, about 53.6% of the industry top 140,000 websites apply inadequate security implementation, which means either insecure or absent implementation of TLS. This indicates that targeting both encrypted and non-encrypted network traffic for information extraction is equally needed.

A tool called NetInfoMiner has been developed, which is a tool for extracting some high-level information from network traffic. The current information types targeted by the tool are the visited links, login events (including usernames and passwords), session cookies, and common Facebook activities (comments, likes, posts, etc.). The tool supports four protocols (HTTP, HTTPS, HTTP2, and SPDY). It is designed to process large amount of network traffic traces.

The NetInfoMiner performs step S507 of analyzing the captured traffic and extracting sensitive pieces of information. In one embodiment, the first information NetInfoMiner targets for extraction is the visited links that clients followed in their browsing sessions. The tool follows a referer-based click inference (RCI) approach originally mentioned in G. Xie, M. Iliofotou, T. Karagiannis, M. Faloutsos, and Y. Jin, "Resurf: Re-constructing web-surfing activity from network traffic," in *IFIP Networking Conference*, 2013. IEEE, 2013, pp. 1-9. To analyze encrypted HTTPS traffic, with the additional support for HTTP2 and SPDY, a different RCI is implemented by adding the idea of filtering known automatically generated advertisement requests mentioned in C. Neasbitt, R. Perdisci, K. Li, and T. Nelms, "Clickminer: Towards forensic reconstruction of user-browser interactions from network traces," in *Proceedings of the 2014 ACM SIGSAC Conference on Computer and Communications Security*. ACM, 2014, pp. 1244-1255.

Figure 7:
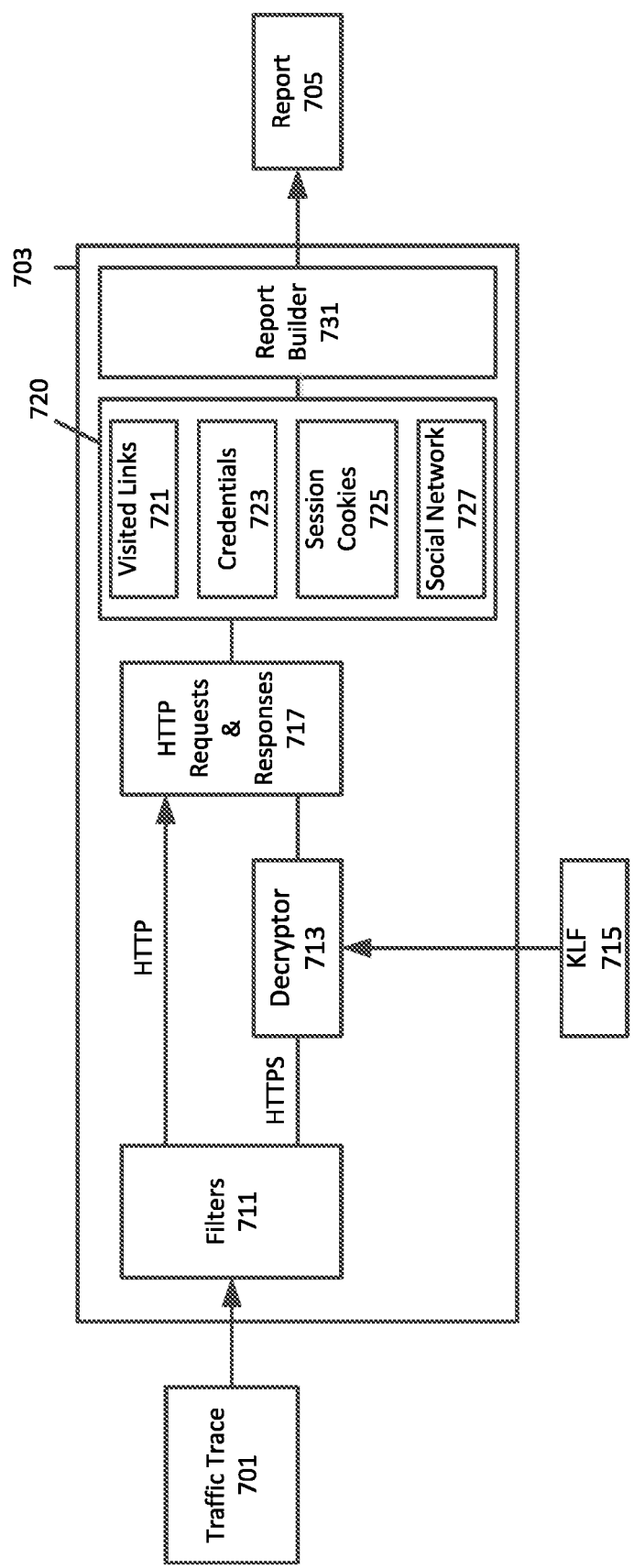
FIG. 7 is a block diagram showing main components of the NetInfoMiner according to an exemplary aspect of the disclosure.

FIG. 7 is a block diagram showing main components of the NetInfoMiner tool. The tool 703 receives captured traffic traces 701, and generates a summary report 705 of the extracted information with a report builder 731. It provides the option to decrypt HTTPS network traffic, by decryptor 713, encrypted using TLS if the encryption keys are available. In particular, in order to extract information from TLS traffic, two components are needed: (a) traffic trace 701 of the entire TLS session, and (b) the server private key or the key log file (KLF) 715 with the session keys. First, the traffic trace 701 of the entire TLS session is needed because each step in the handshake process might be split into a number of packets due to packet length restrictions. Therefore, partially captured TLS sessions might make the decryption impossible. Second, either the client's session keys of the recorded sessions which can be acquired through setting the SSLKEYLOGFILE environment variable, or the private keys of the servers in case the negotiation was established with no Perfect Forward Secrecy (PFS) i.e. RSA key negotiation.

The NetInfoMiner tool 703 may be implemented for Windows, but it can be straightforwardly extended to other OSes. The implementation includes four main engines, one for each targeted information type: Visited Links Mining Engine 721, Credential Mining Engine 723, Session Cookies Mining Engine 725, Social Network Engine 727.

Figure 8:
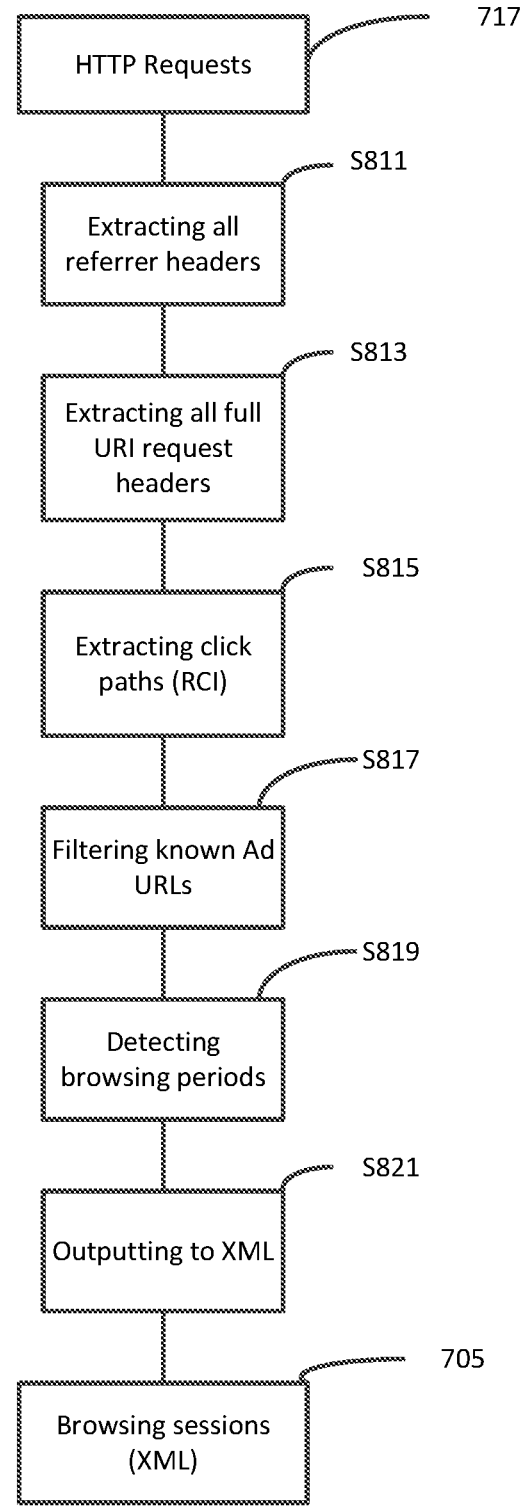
FIG. 8 is a flowchart for the visited link mining engine according to an exemplary aspect of the disclosure.

FIG. 8 is a flowchart for the visited link mining engine 721 and summarizes the different RCI implementation. The original RCI approach claims that a visited link can be detected by matching a referer URI with a previously recorded request. The tool 703 extracts the visited links in HTTP requests 717, in S811, extracting all referrer headers, in S813, extracting all full URI request headers, in S815, extracting click paths (RCI) and, in S817, grouping them logically in a new representation, XML S821, suggested, in S819, by detecting called browsing sessions. Each browsing session, 705, includes a series of visited links by a specific client using a specific browser without the client being idle for more than a period of time τ. Links visited by the same client using a different browser or after being idle for more than τ are represented in a different browsing session. This representation helps understanding clients' behavior better than a list of visited links.

The credentials mining engine 723 retrieves web application credentials (usernames and passwords). The two main challenges for credentials information extraction are the large amount of traffic to be analyzed and the variety of ways web applications encode the credentials values.

Figure 9:
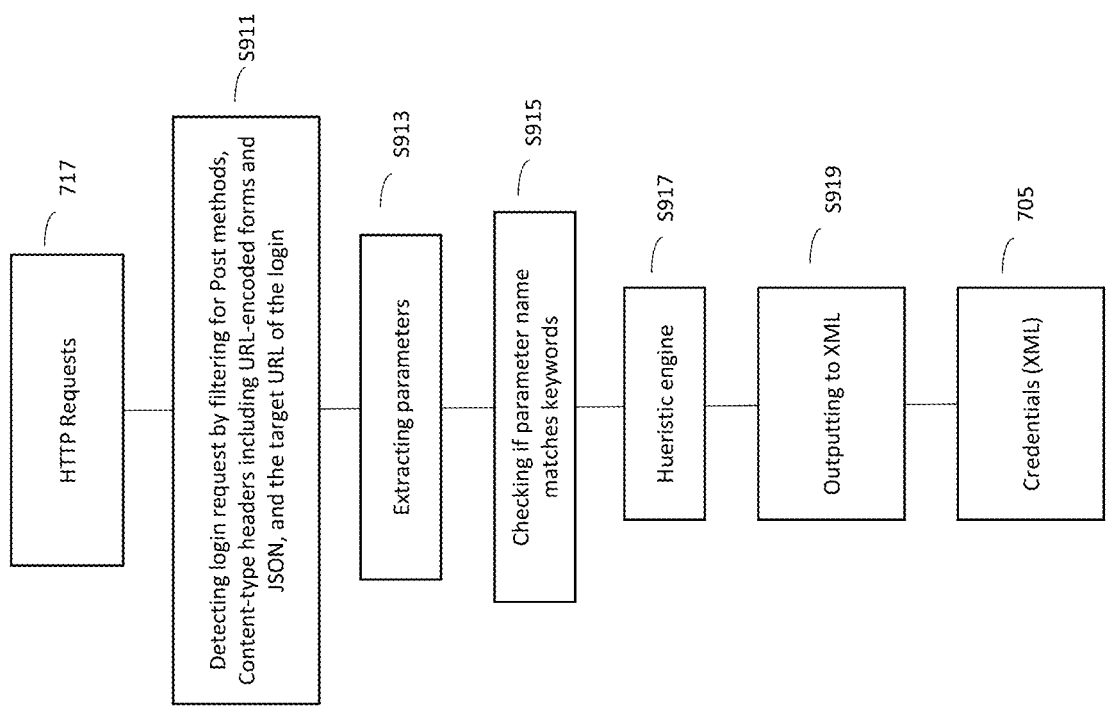
FIG. 9 is a flowchart for the credential engine according to an exemplary aspect of the disclosure.

A sequence of steps of the disclosed credential mining methodology is shown in FIG. 9. It may be assumed that a client generated a set of packets of network traffic, y, in an hour, typically $|y| \cong 53$ Million packets in a 10 Mbps bandwidth. See Juniper.net, "How many packets per second per port are needed to achieve wire-speed?" https://kbjuniper.net/InfoCenter/index?page=contentid=KB14737actp=search, incorporated herein by reference in its entirety. In S911, HTTP requests 717 are analyzed to detect login requests. It may be assumed that n is the number of web applications the client logged into during that hour, and x is the set of the packets generated from all login operations. Assume that each login operation is sent in one packet, and a typical user does not log into more than 100 websites in an hour, that is, $|x|=n<100$. In order to acquire such a small set x from a large set of packets, y, with $|x| \ll |y|$, a technical survey of the login operations in some web applications was conducted. The following common features were observed, they are used to identify the packets in x with high accuracy:

The commonly used protocols for communicating credentials to web applications are HTTP, HTTP2, and SPDY. (Adopting HTTP2 has been increasing since October 2015, and adopted by the top web applications: Facebook, Google, Twitter and others) See w3techs.com, "Usage of http/2 for websites," https://w3techs.com/technologies/details/ce-http2/all/all, accessed: Oct. 20, 2016, incorporated herein by reference in its entirety.

The only observed method used to transmit credentials is the "POST" method.

The two observed "Content-type" headers used for credentials are URL-encoded form and JSON. (These types of content carry out the credentials in a structure of parameters (or keys) and their assigned values).

The target URL of the login requests usually suggest a login page. It includes a phrase like Login, Logon, SignIn, etc.

In S913, acquiring the packets with the above features is achieved through filtering. A number of broad Wireshark filters are constructed to retrieve such packets. In a perfect scenario, the resulting set of packets z should be the same as x which is not the case most of the time. A packet $p \in x$ but $p \notin z$ means that p is not captured by the filters due to different features than the ones mentioned above, resulting in p considered as false negative. The opposite case, that is, for a packet $p \notin x$ but $p \in z$ means that the filters captured some possible login operations which are not, resulting in p counted as false positive. Furthermore, to improve the identification accuracy of login requests, in S915, the parameters names and their values will be deeply analyzed. From the technical survey it was noticed that most of the parameters carrying the usernames and passwords are self-descriptive (using meaningful parameter names). There are few cases where the username and password parameters were not self-descriptive, especially in web applications that do not use HTTPS for sending the credentials. Web applications with HTTPS will rely on encryption to obfuscate the credentials. However, non-HTTPS applications may use their own encoding to obfuscate credentials.

The identification of true username and password parameters is divided into two steps, for each packet in z, all its parameters will be first analyzed by its naming style, then by its value. For the processing of the parameter naming style, a list was prepared consisting of keywords in which username and password parameters are carried across. Such list of keywords includes: username key, uname, email, session user, PWORD, passw, etc. If such parameter is found and it includes a value, that value is assumed to be either a username or a password depending on the parameter name. If, on the other hand, the parameter name does not match any of the above list of keywords, in S917, it will be passed to a heuristic engine. The heuristic engine uses a set $H=h_1, h_2, \ldots, h_r$ of low-level heuristics to compute and assign a pair of scores $(un_k, pw_k)$ for each parameter k indicating how k is related to the respective credential (username or password). The scoring heuristic is explained in Algorithm 1. The algorithm decides whether a given parameter k is considered as a username, password, or simply ignored. A parameter k with a score pair satisfying $\max(un_k, pw_k, t)=un_k$, for some fixed threshold value t, is considered to be a username. On the other hand, if $\max(un_k, pw_k, t)=pw_k$, then k is considered as a password. If neither score exceeds t, the parameter k will be ignored. In S919, the output of the heuristic engine is formatted into XML.

Algorithm 1 Scoring Heuristic

Input: Parameter k, Heurestic_Set H, Thresholds t
Output: decision$_k \in$ {username, password, ignore}
un$_k$ = 0
pw$_k$ = 0
for i = 1 to |H| do
    if Match_Username(k, h$_i$) then
        un$_k$ = un$_k$ + h$_i$ (k)
    end if
    if Match_Password(k, h$_i$) then
        pw$_k$ = pw$_k$ + h$_i$(k)
    end if Algorithm 1 Scoring Heuristic end for
if max(un$_k$, pw$_k$, t) = un$_k$ then
    decision$_k$ = username
else if max(un$_k$, pw$_k$, t) = pw$_k$ then
    decision$_k$ = password
else
    decision$_k$ = ignore
end if
Retrun (decision$_k$)

The heuristic set H in Algorithm 1 is constructed using some results collected from different sources:

1. a study performed on password enforcement policies in Alexa top 25 websites, see A. Das, J. Bonneau, M. Caesar, N. Borisov, and X. Wang, "The tangled web of password reuse." in *NDSS*, vol. 14, 2014, pp. 23-26, incorporated herein by reference in its entirety.
2. an experiment on the trends followed in password creation, see B. Ur, F. Noma, J. Bees, S. M. Segreti, R. Shay, L. Bauer, N. Christin, and L. F. Cranor, ""i added'!'at the end to make it secure": Observing password creation in the lab," in *Eleventh Symposium On Usable Privacy and Security* (*SOUPS* 2015), 2015, pp. 123-140, incorporated herein by reference in its entirety.
3. A study performed in this disclosure of the 10 million stolen usernames and passwords data set found in wpengine.com. See wpengine.com, "Unmasked: What 10 million passwords reveal about the people who choose them," http://wpengine.comiunmasked/, accessed: Oct. 20, 2016, incorporated herein by reference in its entirety.

The above results include the following:

1. It is a trend for usernames to be in the form of emails.
2. Passwords created with enforced policies have identifiable features related to the creation policy, such as having combinations of symbols, digits, upper and lower case letters.
3. Out of 10 Million usernames 97.5% have 4-16 characters without including the domain name in case of emails.
4. Out of 10M passwords 94.4% have between 4 and 11 characters.
5. 7% of 10M passwords start with a capital letter.
6. Passwords might have letters then numbers or vice versa.
7. 45.5% of 10M passwords end with digits.
8. 68.1% of 10M passwords and 92.3% of usernames have more alphabetical than non-alphabetical characters.
9. 90% of usernames and 88% of passwords belong to set of patterns. These patterns are shown in Table 4.1, only the patterns that represent more than 1% are shown. For instance, in the 10 million passwords, a total of 11715 patterns were detected, only 8 of them represent more than 1% of the passwords in total these 8 patterns accumulate 88.70% of all the passwords patterns.

TABLE 4.1

Detected usernames and passwords patterns in the 10M data set

|  | All | Usernames 6281 | | Passwords 11715 | |
|---|---|---|---|---|---|
| >1% | Patterns | s | 43.57% | s | 38.24% |
| | | sD | 22.25% | D | 20.35% |
| | | sbs | 10.93% | sD | 19.11% |
| | | Cs | 3.43% | Ds | 4.45% |
| | | sDs | 2.57% | sDs | 2.51% |
| | | sbD | 1.86% | CsD | 1.71% |
| | | CsD | 1.62% | Cs | 1.26% |
| | | D | 1.52% | C | 1.09% |
| | | sbsD | 1.25% | | |
| | | C | 1.14% | | |
| | Total | 10 | 90.16% | 8 | 88.70% |

C: capital letter character
s: small letter character
D: Digit (0-9)
b: symbol

Figure 10:
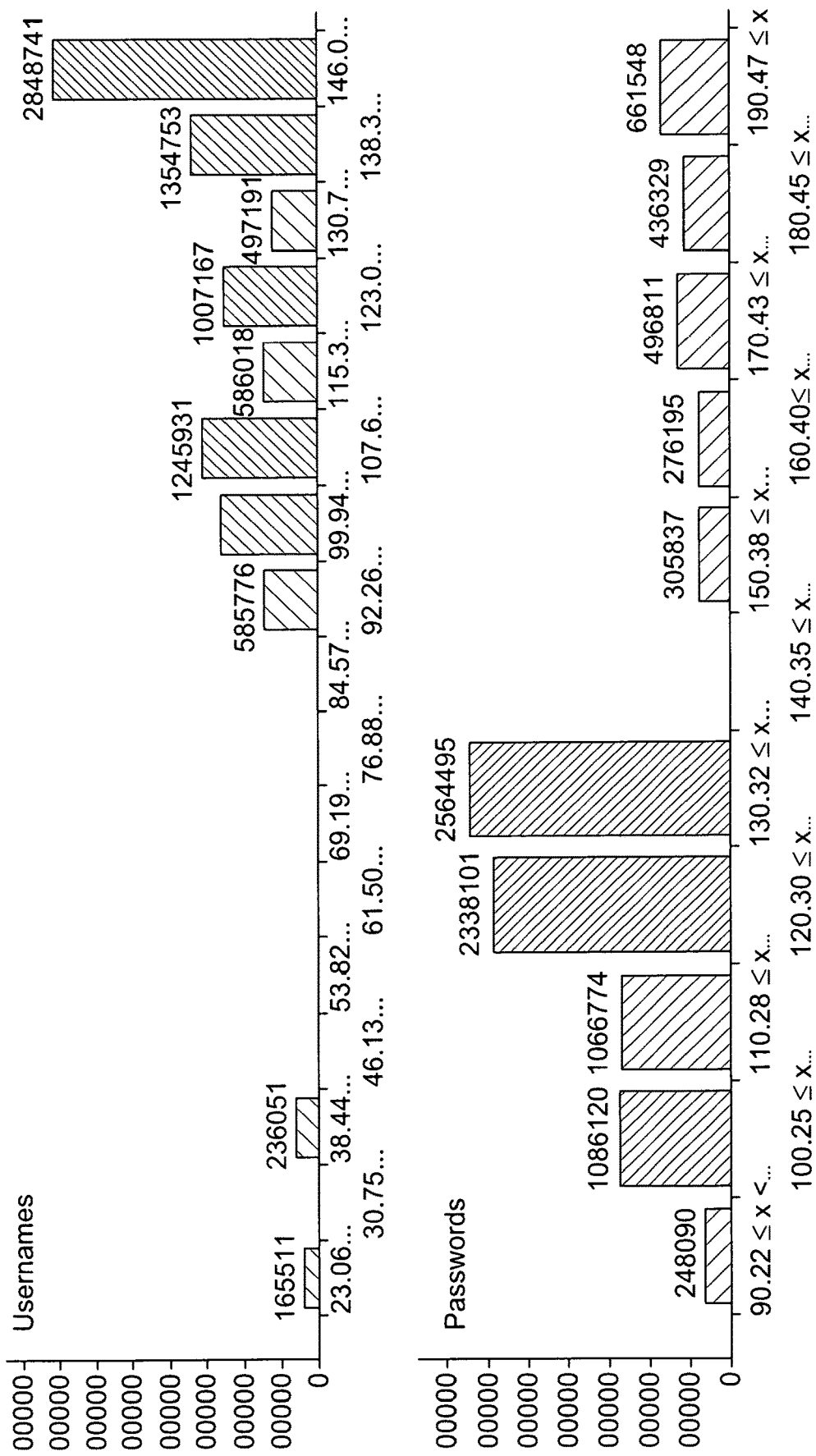
FIG. 10 is a graph showing the calculated heuristic scores for the 10 million usernames and passwords.

To identify the heuristic scores of usernames and passwords, the heuristics were implemented on the 10 million stolen usernames and passwords data set. The calculated scores of all the usernames and passwords are shown in FIG. 10. The figure shows the ranges of the calculated heuristic scores for the usernames in the top and for passwords in the bottom. For instance, 2564495 passwords have a score between 130.32 and 140.35.

Based on the calculated scores, the ranges to identify usernames and passwords have been set and are shown in table 4.2. An overlap in the scores ranges between usernames and passwords can be noticed which will be reflected in the evaluation section 5.3.3 as a main source for false detection.

TABLE 4.2

Heuristic scores ranges

| | From | To | From | To |
|---|---|---|---|---|
| Password | 90.2 | 140.4 | 150.4 | 201 |
| Username | 92.3 | 153.8 | — | |

After detecting either a username or a password parameter, the process of building the credentials list starts. Each detected username or password is assigned to a credential entry in the credential list. Assume that a username parameter uname is detected with no password for a specific web application w. A credential entry c is created for w with only a username parameter. Assume that, shortly after, a password parameter pword is detected for w. Then pword should be added to c. The previous case is a typical case for detecting credentials in web applications that implement two steps login operations, where the username and the password are entered separately, such as Yahoo and Google.

Another case might happen when a credential entry c exists for a web application w with a username parameter uname and a password parameter pword before detecting the same parameters uname and pword again but with different values. This would suggest possible incorrect credentials. For possible forensic applications of NetInfoMiner, all the detected credentials are saved even if they might be incorrect, since they can be used as a proof of a login attempt. To verify whether the detected credentials yielded a successful login or not, two solutions are presented: (1) monitoring the creation of a session management cookie which might indicate a successful login operation, and (2) analyzing the HTTP response for an incorrect login. An incorrect login will result in an HTTP response with an HTML page including a phrase suggesting a failed login such as "Incorrect username or password" or other error messages, or if the login form is displayed again, since sometimes a failed login does not generate any errors.

Figure 11:
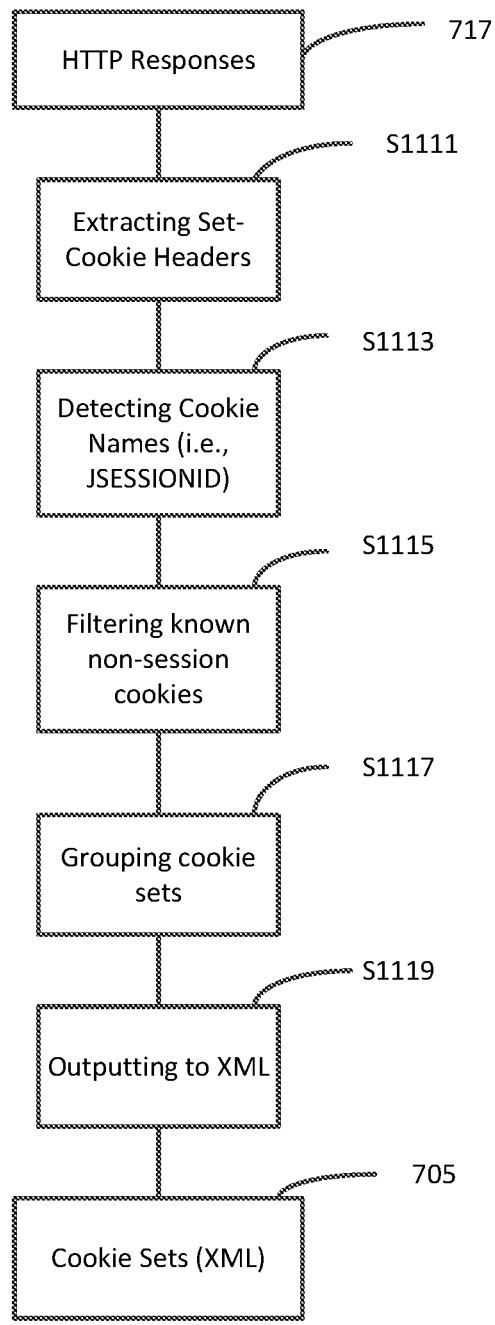
FIG. 11 is a flowchart for a session cookies engine according to an exemplary aspect of the disclosure.

The Third type of information extracted by NetInfoMiner is session cookies. FIG. 11 is a flowchart for a session cookies engine 725. Web application servers communicate the establishment of a cookie to clients using the set-cookie header in HTTP responses. Upon successful login, the client receives a Set-Cookie header from the server with the value of the cookie that will be later included in every transaction between the client and the server in the current session. Apart from authentication, Web applications use cookies for other purposes. Hence, not all set-cookie headers contain a session cookie. To distinguish a session cookie from other variants, the naming of the newly set cookies was targeted. Known web development frameworks can be fingerprinted using their cookie naming. For instance PHPSESSID is typically used in PHP, JSESSIONID in J2EE, CFID and CFTOKEN in ColdFusion, etc. See R. Siles, "Session management cheat sheet?session id properties," Online at https://www.owasp.org/index.php/Session_Management_Cheat_Sheet# Session_ID_Properties, 2013, incorporated herein by reference in its entirety. The web framework usage statistics justify that direction, since the collected session cookie names covers more than 70% of the mostly used frameworks, for instance PHP is used in 26% of all websites, several ASP versions around 30%, J2EE with 9%, etc. See trends.builtwith.com, "Statistics for websites using framework technologies," https://trends.builtwith.com/framework, accessed: Oct. 20, 2016, incorporated herein by reference in its entirety. A list of known session cookie names was prepared, in addition to other customized names for the session cookies implemented by some famous web applications, Facebook for instance applies three cookies to maintain user sessions, "datr", "c use", and "xs". See G. Acar, B. Van Alsenoy, F. Piessens, C. Diaz, and B. Preneel, "Facebook tracking through social plug-ins," 2015, incorporated herein by reference in its entirety. Any detected cookie which is set in a time frame close to a detected login attempt to the same host, and it's name matches a keyword in the prepared list, that cookie will be assumed as a session cookie.

NetInfoMiner's approach for detecting session management cookies as shown in FIG. 11 can be summarized as follows:

1. In S1111, extract all HTTP responses 717 with Set-Cookie headers.
2. In S1113, detect a cookie with a name matching the known names of session cookies (i.e. JSESSIONID).
3. In S1115, filter out known non-session management cookies (i.e. _ga, _utma, _utmb, etc.).
4. In S1117, the remaining session cookies are grouped in cookie sets, each set represent the cookies defined between a client and a server.
5. The final step, S1119, is exporting the detected cookie sets into an XML structure, 1103. A sample extracted cookie sets is shown in FIG. 16. The values of the cookies are not shown in this sample for privacy reasons.

Figure 12:
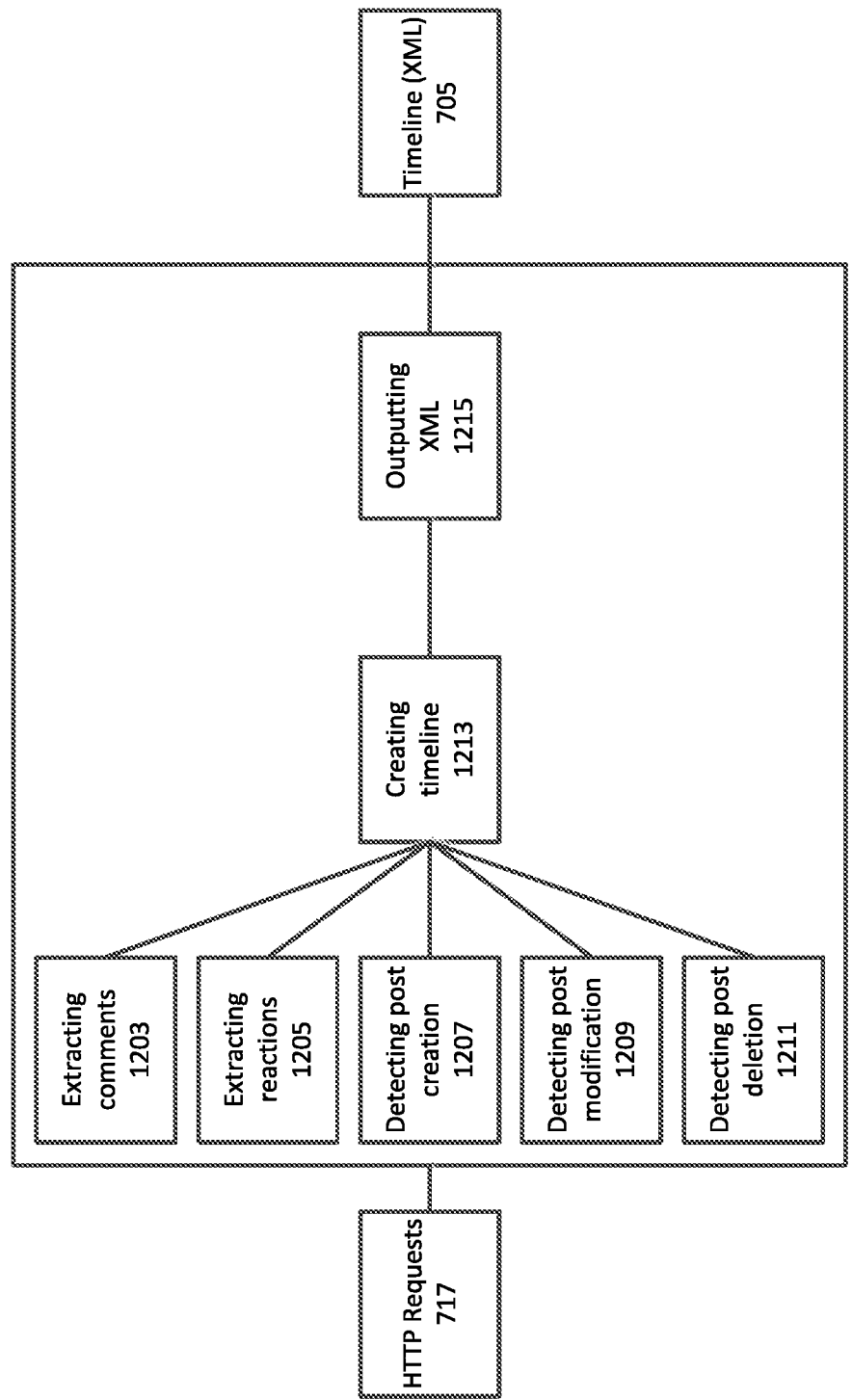
FIG. 12 is a block diagram for the social network mining engine according to an exemplary aspect of the disclosure.

The fourth type of information extracted by NetInfoMiner is related to tracking some users activities on the largest social network, Facebook. The current tracked activities are, comment, reactions (like, love, etc.), add post, edit post and delete post. The methods Facebook follow to implement such activities were studied by capturing the network traffic generated by performing them and analyzing them using Wireshark. A methodology for the social network mining engine is shown in FIG. 12. To extract only the packets with interesting activities from HTTP requests 717, comments 1203, reactions 1205, posts creation 1207, post modification 1209, post deletion 1211, a group of Wireshark filters was constructed, the filtering scheme is based on searching for requests with certain keywords; these keywords are the parameters names used by Facebook to implement each activity. Each captured request 717 contains a large number of parameters needed by Facebook. In the scope of the disclosed work, few of them are of interest, such as, the text, the user, the privacy settings (Only me, Friends, Public, or Custom list), the time, and the activity type. After extracting the desired information, a timeline 705 of the activities 1213 will be constructed and output as XML 1215.

Figure 13:
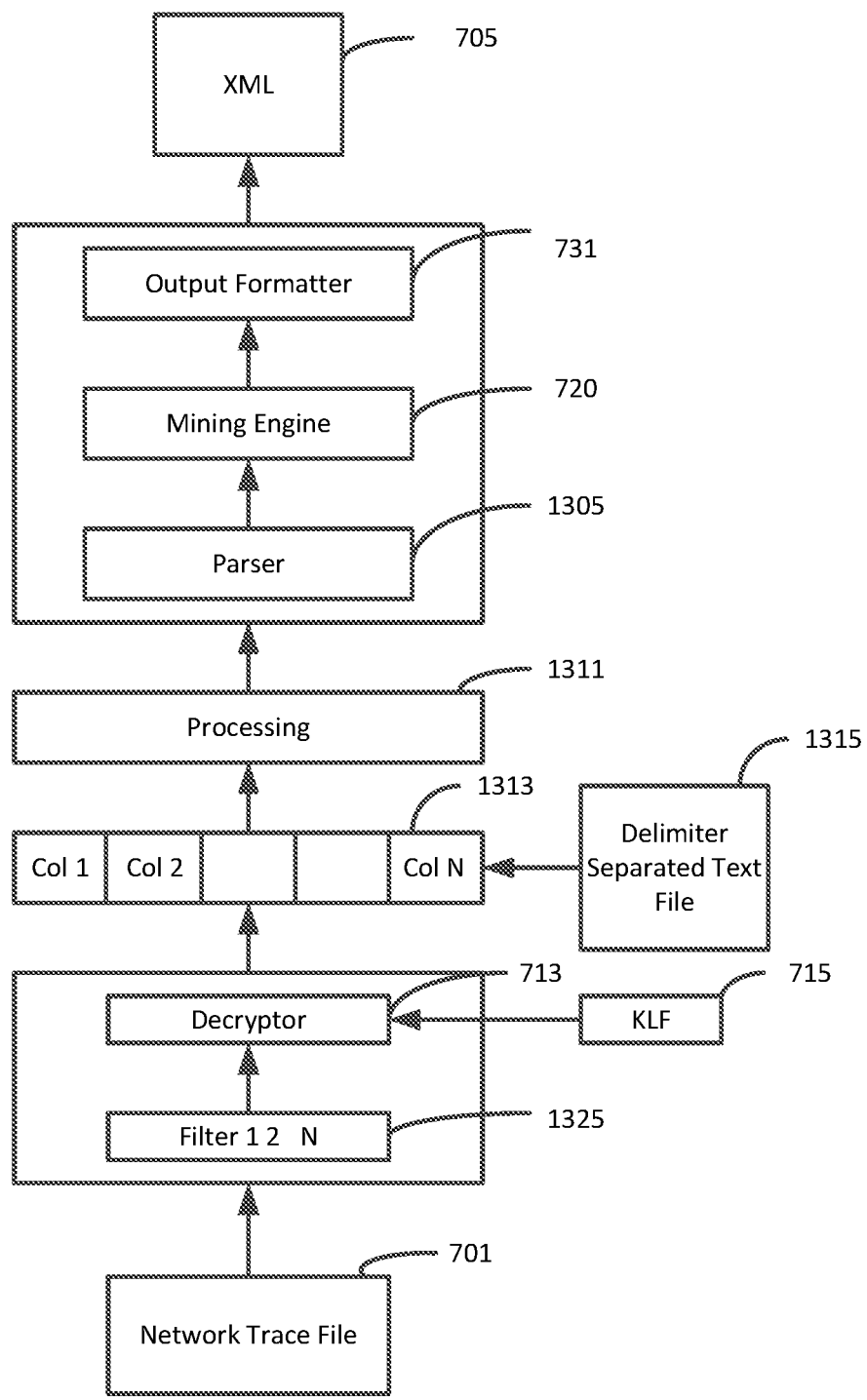
FIG. 13 is a flowchart illustrating the NetInfoMiner General Engine Implementation according to an exemplary aspect of the disclosure.

The general implementation approach for each engine is shown in FIG. 13. FIG. 13 is a flowchart illustrating the NetInfoMiner General Engine Implementation.

credentials in the network traffic. This is used to identify the requests or responses that are used to carry the desired information.

3. After identifying the requests or responses with the desired information, they are analyzed for common identifiable features (using a text file 1315), such as the protocol method, header names, parameter names, etc.

4. The identified features need to be incorporated into a filter to identify similar requests or responses in other network traffic.

The output of this filtering step is a sequence of strings 1313 representing only desired fields (time, source IP, etc.) from selected packets. In few cases, the output of this step needs to be processed 1311 further due to some implementation limitations (e.g. HTTP2 data objects cannot be extracted in ASCII encoding directly). In this area, it may depend heavily on the strong features provided by the task automation tool from Microsoft PowerShell. Afterwards, the processed results can be sent to the appropriate mining engine 720 which may be implemented in C language. The final output is collected from all mining engines to build, 731, an HTML formatted report 705 for each client.

TABLE 4.3

The Implemented Wireshark Filters for each Mining Engine in a Simplified Syntax

| Mining Engine | | Simplified Wireshark Filters |
|---|---|---|
| HTTP Visited links | | (HTTP with Referer OR Request URI) AND HTTP with User Agent |
| HTTP Credential | | (URL-Encoded form OR Json) AND HTTP POST Method AND Full URI contains (log, auth, signin, signup, register, username, account, or password) |
| HTTP2 Credential | | (HTTP2 OR SPDY Request) AND data segment contains (pass, username, password, email, or session_) |
| HTTP Cookies | | HTTP with Set-cookie |
| HTTP2 Cookies | | HTTP2 OR SPDY Header Name contains (set-cookie) |
| Social Network (Facebook) | Comments | HTTP2 Or SPDY request to Facebook with data segment containing "comment_text=" |
| | Reactions | HTTP2 Or SPDY request to Facebook with data segment containing "reaction_type=" |
| | Add Post | HTTP2 Or SPDY request to Facebook with data segment containing "xhpc_message=", "privacyx=" and doesn't contain "ref=edit" |
| | Edit Post | HTTP2 Or SPDY request to Facebook with data segment containing "xhpc_message=", "privacyx=" and "ref=edit" |
| | Delete Post | HTTP2 Or SPDY request to Facebook with header indicating "POST" method and URL containing "/ajax/timeline/delete?identifier=" |

NetInfoMiner may leverage the various capabilities provided by Wireshark, in particular, the command line version tshark. NetInfoMiner 703 receives as input the network traffic dump file 701 and possibly the TLS key log file (KLF) 715 or RSA private key if available. Then, it initiates calls to tshark to extract the desired types of information by applying a sequence of Wireshark filters 1325. A simplified syntax for all the applied filters for each mining engine are shown in table 4.3. Sometimes due to different column naming on Wireshark, some filters were split (i.e. a filter for URL-encoded Form and another for json). Each filter 1325 takes care of keeping only packets needed in extracting a particular type of information (i.e. HTTP2 headers with Set-cookie values). The process of building these filters can be generalized as follows:

1. Record network traffic while performing the desired information to be extracted (login operation, visiting links, etc.).

2. Analyze the captured network traffic by looking for known keywords used in performing the operation. For instance, in credential extraction, search for the used NetInfoMiner is designed with the support of HTTP, HTTP2 and SPDY protocols. There is a significant difference between the syntax of HTTP protocol in one hand and both HTTP2 and SPDY on another. For instance, in a single HTTP POST request, all the headers and data of the same request are close together making it easier to extract and process them. However, in HTTP2 and SPDY, the requests and responses might be multiplexed and the data segment and the header segment of the same request might be interleaved with other segments of other requests. This makes the process of extracting the same information type (e.g. credentials) in HTTP2 and SPDY more complex than in HTTP. So, the processing performed by NetInfoMiner for HTTP2 and SPDY has a lot of differences and require further steps not required for HTTP. While the general approach shown in FIG. 13 is still the same, but for the same targeted information type, totally different filters and output pre-processing are implemented. The extra processing required for HTTP2 and SPDY includes two parts. First, the current implementation of Wireshark (Version 2.2.1) does not provide well organized segmentation of the HTTP2 and SPDY headers as it does for HTTP. For instance, in HTTP, the user—Agent header can be directly accessed by the column identifier http.user_agent while in HTTP2 and SPDY such identifier does not exist yet. The second extra processing is for having some required information type (i.e. credential parameter) in a different packet than the header segment of the same request, in case they were not transmitted together. This requires NetInfoMiner initiating an additional call for tshark to extract the required headers of a previously processed data segment.

A sample output of a browsing session is shown in FIG. 14. The description of the XML fields in the extracted browsing sessions are mentioned below:

Time: The time stamp of the first visited link included in the current browsing session.
1. Client: The IP address of the machine the client used to perform the current browsing session.
2. Duration: The time between the first and last detected visited link in the current browsing session.
3. Browser: The application from which the client conducted the current browsing session.
4. visit time: the time stamp of the visit of the link.
5. link: the URI of the visited link A sample extracted credential is shown in FIG. 15. The description of the XML fields is mentioned below:
1. Client: The IP address of the machine the client used to perform the login attempt.
2. Host: The host name of the HTTP server that the client is trying to log into.
3. Browser: The application from which the client used to perform the login attempt.
4. LoginType: the type of the login process whether a Single-Page or Two-Page login.
5. DetectionType: specifies the way the username and password were detected (Parameter naming or Heuristics).
6. LoginTimeUsername: the time stamp when the username was initially sent to the server.
7. UsernameKey: the parameter name of the username.
8. UsernameValue: the actual username string, might be an email.
9. LoginTimePassword: the time stamp when the password was sent to the server. In Single-Page logins, the LoginTimeUsername and the Login-TimePassword will be exactly the same, since both parameters are sent together. While in Two-Page logins the timestamps will be different.
10. PasswordKey: the parameter name of the password.
11. PasswordValue: the actual password string.
12. UsageCount: Number of times these credentials were used.
13. LoginTime: the time stamp of beginning the login attempt into the above host with the above username and password. Since there might be several attempts.

For the cookies, all cookies exchanged between a client and a host will be represented in a different cookie set. A sample extracted cookie set is shown in FIG. 16.

In this section, the extensibility feature in NetInfoMiner is described. Also, some implemented features are hard coded in the current implementation but can be modified to provide extensibility, these features are discussed with the required modifications to reach that goal. NetInfoMiner was designed with extensibility in mind, in order to make it a solution that can last longer. The main reasons that require the extensibility feature to exist is the following:
1. All the mining engines in NetInfoMiner depend on a group of Wireshark filters to extract raw traffic content with possible existence of desired information. Modifying these filters has a crucial effect on the accuracy of information extraction. So, in the future, if the method to extract a desired information changes, these filters can be modified easily in text format and do not require any compilation. For instance, to extract possible login requests for the credential engine, all HTTP POST requests to a page that includes the phrase "login" are forwarded for further processing, if in the future a new common phrase is noticed in login pages, this phrase can be added to the Wireshark filter that is responsible for extracting the login requests.
2. The visited links engine depends on a list of known advertisement URLs used to filter out requests that are automatically generated for advertisement proposes. The list exist in a separate text file and can be manually edited to optimize the accuracy of the extraction in case new advertisement requests have been noticed and require to be filtered out.
3. The credential and session cookie engines depend on a hard coded list of parameter names (keywords) that most likely hold usernames and passwords (uname, passwd, etc.) or session cookies (ASPSESSION, PHPSESSION, etc.). These keywords might change in the future, this would affect the accuracy dramatically. To make the solution extensible, the code must be modified to read these keywords from a text file rather than being hard coded.

In the process of evaluating NetInfoMiner the following limitations were faced:
1. There is no existing data set that can be used to evaluate the developed tool. The reasons for that is related to the following:
    (a) The tool can analyze encrypted traffic if the session keys were acquired. In this work, the session keys were acquired using the proposed DESEK process, other network traffic encrypted using unavailable session keys cannot be analyzed using this tool.
    (b) There is no party that is willing to share network traffic that holds users credentials or that can expose users privacy.
2. The number of responding test subjects was limited due to the sensitivity of the experiment (exposing credentials).
3. Performing comparative evaluation against similar tools is not possible due to different supported protocols and different extracted data types.
4. The evaluation of the visited links mining engine was limited and performed manually due to the lack of mechanism to collect the true values of visited links from test subjects.

For the evaluation process, a windows VM was created and distributed among a group of test subjects. The VM included a prototype of the SSLKeyExtractor software, upon the launching of the software the infection process starts, and the software schedules a task to periodically transmit both the captured network traffic generated by the subjects in addition to the created KLF. To collect data generated by popular websites, a local page was set up including links to the top 500 websites according to Alexa. Each test subject was asked to visit some websites and create dummy accounts and then log into these accounts.

After completing the data collection from the test subjects, NetInfoMiner was used for the information extraction.

The evaluation of the visited links mining engine was done by comparing the results with the browser history, the results show that NetInfoMiner successfully identifies all the visited links with few false positives resulted by uncontrolled redirects as mentioned in the original paper. See G. Xie, M. Iliofotou, T. Karagiannis, M. Faloutsos, and Y. Jin, "Resurf: Re-constructing web-surfing activity from network traffic," in *IFIP Networking Conference*, 2013. IEEE, 2013, pp. 1-9, herein incorporated by reference in its entirety. There is no quantitative measurements for the accuracy of the visited links mining engine due to the lack of mechanism to acquire them. Nonetheless, NetInfoMiner applies the RCI approach mentioned in Xie, et al. which is claimed to have an accuracy up to 95% of extracting the visited links. Also, the addition of filtering known advertisement requests claims extracting visited links with false positives between 0.74%-1.16% using the RCI approach. See C. Neasbitt, R. Perdisci, K. Li, and T. Nelms, "Clickminer: Towards forensic reconstruction of user-browser interactions from network traces," in *Proceedings of the 2014 ACM SIGSAC Conference on Computer and Communications Security*. ACM, 2014, pp. 1244-1255, herein incorporated by reference in its entirety. The only addition in NetInfoMiner is the support of HTTPS. Due to the reasons mentioned above, the accuracy of the visited links in NetInfoMiner can be assumed to be similar to the accuracy mentioned in ClickMiner Neasbitt et al.

Regarding the evaluation of the credential and session cookie mining engines, each test subject reported how many websites he logged into. That information is then used to tell how many of them NetInfoMiner could extract based only on the test subject's network traffic.

FIG. 17 shows the results of the empirical evaluation of the credential engine. Among 70 communicated credentials, NetInfoMiner could successfully identify 65 of them, that is 92.86%. The traffic was analyzed to understand the reason NetInfoMiner missed these 5 websites. No POST requests were noticed that generated from these websites neither in HTTP, HTTP2, nor SPDY. The "Network recorder" feature was available in most browser developer tools; Pinterest for instance, after a successful login generated a GET request with only the session cookie, the credentials were not observed anywhere. Other websites didn't generate any HTTP request on the network traffic while login.

The results of the session cookie engine 725, as shown in FIG. 18, show that it is able to extract the session cookies from 77.14% of the tested web applications.

In the process of evaluating the credential and session cookie engines, many experiments were conducted that involve capturing login attempts into web application, only three of those were documented in detail that enabled accurate measurements. Table 5.1 shows quantitative measurements of the accuracy of the credential engine 723 when evaluated using three captured network traffic files with login attempts to a group of widely known web applications. The results display good accuracy in extracting login attempts with overall 6.35% false positive and 9.2% false negative. For instance, the third packet trace file (PCAP) captured 30 login attempts, 5 of them where not extracted by the credential engine 723 and they are considered as false negatives, and 3 where not credentials and considered as false positives; they are parameters with names that match the expected parameter names of usernames and passwords. The overall percentage of the false positives was calculated for the three files as the ratio of the false positives compared with the total extracted login attempts. On the other hand, the overall percentage of the false negative was calculated for the three files as the ratio of the false negatives compared to the total number of actual login attempts.

Table 5.2 shows the quantitative measurements of the accuracy of the cookie engine for the same captured network traffic used for the evaluation of the credential engine. The results show a significant lower accuracy compared to the credential engine, with 40.04% false positive and 30.77% false negative. For instance, pcap file 3, with of 30 login attempts to 30 sites, the session cookie sets (cookies exchanged between client and server) of 13 sites were not extracted and considered as false negatives, and 5 extracted cookie sets were considered as false positives since they are related to known advertisements and content management web applications (adnxs.com, akamai.com). The overall percentage of the false positives was calculated for the three files as the ratio of the false positives compared with the total extracted session cookie sets. On the other hand, the overall percentage of the false negative was calculated for the three files as the ratio of the false negatives compared to the total number of login attempts. The results of the cookie engine suggest that it needs further improvements, especially targeting the elimination of the Ad related cookies which totaled 26.58% of the extracted session cookies as shown in Table 5.2.

TABLE 5.1

Quantitative measurements of the accuracy of the credential engine

| PCAP | Login Attempts | Extracted Login Attempts | | FP | FN |
|---|---|---|---|---|---|
| | | HTTP | HTTP2 | | |
| 1 | 18 | 15 | 3 | 0 | 0 |
| 2 | 17 | 13 | 4 | 1 | 1 |
| 3 | 30 | 22 | 6 | 3 | 5 |
| Total | 65 | 50 | 13 | 4 | 6 |
| | Inaccuracy | | | 6.35% | 9.23% |

TABLE 5.2

Quantitative measurements of the accuracy of the cookie engine

| PCAP | Login Attempts | Extracted session cookie sets | | FP | FN | Ad Cookies |
|---|---|---|---|---|---|---|
| | | HTTP | HTTP2 | | | |
| 1 | 18 | 28 | 1 | 17 | 5 | 13 |
| 2 | 17 | 20 | 3 | 12 | 2 | 4 |
| 3 | 30 | 23 | 4 | 5 | 13 | 4 |
| Total | 65 | 71 | 8 | 34 | 20 | 21 |
| | Inaccuracy | | | 43.04% | 30.77% | 26.58% |

In this section the results of evaluating the heuristic engine are provided which is a part of the credential engine 723. The reason why an isolated evaluation of the heuristic engine is provided is that most detected credentials are detected using parameter naming rather than heuristics. But, in the future, web applications may change their naming styles which would render the parameter naming detection approach insufficient. For that reason the heuristic engine is required to make NetInfoMiner a solution that could last longer. Unfortunately, there aren't many sites that were not detected using parameter naming. So, evaluating the heuristic engine was resorted to using the 10 million stolen usernames and passwords data set. See wpengine.com, "Unmasked: What 10 million passwords reveal about the people who choose them," http://wpengine.com/unmasked/, accessed: Oct. 20, 2016, incorporated herein by reference in its entirety. The goal was to evaluate the implemented heuristics and whether they can identify usernames and passwords correctly. Table 5.3 shows the results of testing the implemented heuristics and their ability to identify usernames and passwords. As the table shows, among 10 million passwords 94.8% were correctly identified as passwords but 67.95% were identified as usernames, this is related to some similar features between usernames and passwords that the implemented heuristics aren't able to correctly distinguish the difference. For instance, the username "mama1998mama" is also a possible password. Also, among the 10 million usernames, 91.66% was correctly identified as usernames but 89.86% was identified as passwords for the same earlier mentioned reason. On the other hand, the heuristics were tested on parameters that do not include any usernames or passwords. Among 6075 parameters, 26.5% were identified as passwords and 25.53% were identified as usernames. For instance, the parameter en-US is a password according the implemented heuristics.

The above noticed results suggest that the heuristic engine still require more work due to significant amount of false detections. The additional work can be by either adding more distinctive heuristics or by optimizing the heuristic scores range.

TABLE 5.3

Results of testing the Heuristic scores on the 10M data set

|  | Identified as | | |
| --- | --- | --- | --- |
|  | Password | Username | Examples |
| Is Password (10M) | 94.8 | 67.95 | mama1998mama (98.66) |
| Is Username (10M) | 89.86 | 91.66 | kleiner.kruemmel86 (151.29) |
| Parameters (6075) | 26.5 | 25.53 | as pw: en-US (110.74) |
|  |  |  | as un: treatment_general (103.29) |

For evaluating the extraction of Facebook common activities, the network traffic of performing the targeted activities were captured individually several times, and all of them were extracted successfully.

For further evaluation, the following experiment were conducted:
1. In Firefox browser, the support for HTTP2 was disabled. The fallback protocol negotiated with Facebook if HTTP2 is not enabled was SPDY.
2. Logged into a Facebook account and performed the following activities:
   (c) Like PostID 10157703716340307
   (d) Comment "Hala Madrid!" to postID 10151132821914953
   (e) Love postID 10157692692170307
   (f) New Post "Hellooooooooo"
3. Switched to Chrome browser (HTTP2 is enabled by default) and performed the following activities:
   (a) Edit postsID 10157814419505578 to "Hellooooooooo-Edit"
   (b) Delete Post 10157814419505578

After capturing the traffic generated from performing the previous activities, NetInfoMiner was used to extract these activities from then traffic traces. The results show that, it was able to extract all of the previous activities. But, one of the activities was missing the user Facebook ID property which was expected to be extracted. This reflects that Facebook doesn't always use the same parameters for communicating the same activity. Nonetheless, there is a solution to recover that missing property by searching for it in the same recorded TCP stream in the network traffic. Facebook generates large amount of requests in a single TCP stream, a missing property in one request might exist in others. This option was investigated and it was found that the missing user Facebook ID exists in other requests in the same TCP stream of the recovered activity, and since a single TCP stream can only contain the activities of a single Facebook user, extracting that missing element from other requests in the same stream is a valid choice.

The effect of the negotiation of different protocols by clients and web applications is mentioned in Section (2.2). To evaluate how NetInfoMiner adopts with such effect, a quick experiment was conducted. Firefox browser enables the clients to disable or enable the support for HTTP2 protocol. The twitter website was visited and logged in with HTTP2 enabled, then disabled the support for HTTP2 and re-logged again. The captured traffic of the experiment was then analyzed using NetInfoMiner. The tool successfully detected both login operations even though one was carried over HTTP2 while the other was over SPDY.

A special case was observed in the ebay web application that demonstrated the advantage of the heuristic engine. As seen in FIG. 18, although there are parameters with names suggesting the existence of a username (userid) and a password (pass), the credential engine 723 neglected these two parameters since they are empty. Instead, the heuristic engine detected both parameters correctly even though their names only include numbers. The matching criteria for the username is its email syntax, and for the password it is its high heuristic score due to matching with enough number of password features to be assumed as one.

Table 5.4 shows a comparison of the capabilities of NetInfoMiner to other existing tools. NetInfoMiner targeted new types of information not targeted by existing solutions due to the new option of decrypting HTTPS traffic. As the table shows, NetInfoMiner is the only tool compared to the others that supports the analysis of HTTPS traffic. In addition to the support for HTTP2 and SPDY for extracting credentials, session cookies and Facebook common activities.

There is no need to compare the accuracy of the Visited links engine 721 in NetInfoMiner against ClickMiner, of Neasbitt et al., since it applies the same RCI approach mentioned in Xie et al., with the addition support for HTTPS protocol. Regarding NetworkMiner, no measurable accuracy has been mentioned regarding the visited links extraction.

The credential engine 723 in NetInfoMiner shows acceptable accuracy in extracting credentials carried across multiple protocols, HTTP, HTTPS, HTTP2 and SPDY. The credentials extraction in NetworkMiner has no mentioned accuracy, but, by testing it, it has very limited accuracy since it only dumps all HTTP POST parameters and cookies. Same thing regarding the session cookies, although NetInfoMiner's session cookie engine 725 didn't show the expected accuracy in extracting session cookies, it is still better than NetworkMiner, since the latter only dumps all cookies in the traffic in a separate tab with no fixation on session cookies.

TABLE 5.4

Supported features in NetInfoMiner tool compared to others

| Extracted Info. | Protocol | Click-Miner | Network-Miner | NetInfo-Miner |
|---|---|---|---|---|
| Visited Links | HTTP | ✓ | ✓ | ✓ |
| | HTTPS | — | — | ✓ |
| | HTTP2 | — | — | In Progress |
| | SPDY | | | |
| Credentials | HTTP | — | (*) | ✓ |
| | HTTPS | — | — | ✓ |
| | HTTP2 | — | — | ✓ |
| | SPDY | | | |
| Session Cookies | HTTP | — | (*) | ✓ |
| | HTTPS | — | — | ✓ |
| | HTTP2 | — | — | ✓ |
| | SPDY | | | |
| Facebook Activities | HTTP2 | — | — | ✓ |

(*) A dump of all cookies and parameters extracted from traffic without filtering undesired data.

The process of improving the accuracy of NetInfoMiner and the possibility of making the leaning process automatic is now described.

Throughout the development of NetInfoMiner it was continuously evaluated using many network traffic captures to evaluate the extraction accuracy and perform improvements. The process of manual learning of NetInfoMiner can be summarized as follows:

1. Traffic Capture Feeding: each attempt to teach NetInfoMiner starts with feeding it with a new traffic capture that contains the desired information to be extracted (Credential, cookies, etc).
2. Result Evaluation: after feeding NetInfoMiner with a traffic capture, the extraction results are manually inspected. NetInfoMiner was programmed to generate traces for each processing step to help in the learning process, these traces are manually inspected to figure out the reasons behind inaccurate results. The most common reasons behind inaccurate results were parsing issues or missing keyword (in case of credential extraction). Regarding the parsing issues, it is by far the most common issue behind inaccurate results; the parsing issues are related to the various techniques in web application development. For instance, some web applications applies an unconventional method for transporting the credentials using delimiters that conflict with delimiters used by NetInfoMiner in the different processing stages. Up to this point, NetInfoMiner breaks when processing the results for some web applications, it is minimized, rare, and can be circumvented manually, but it exits nonetheless. On the other hand, the missing keyword issues is at its minimum effect at this point due to the collection of adequate amount of keywords that can identify the desired information with acceptable accuracy.
3. Reprogramming: after identifying the reasons behind inaccurate results, the code of the related part of NetInfoMiner that is behind the inaccurate result is modified to circumvent the issue. In most cases the modification involves changing a delimiter, adding a new keyword, or modifying Wireshark filter.

Requirements for making automatic learning for NetInfoMiner possible are provided. In general, providing a true positive source of information is the main key. For instance, in the credential engine 723, if the credential engine was somehow linked to the browser database for logged credentials to detect the usage of credentials. Then this information is used as a feedback to NetInfoMiner. Also the browser history can be used to improve the accuracy of the visited links engine.

A new client side extraction process on SSL/TLS called DESEK is disclosed. The extraction process exploits a new feature in some browsers that enables the logging of SSL/TLS session keys into a key log file (KLF) in plaintext. A user-privilege software called SSLKeyExtractor has been implemented which is responsible for the creation of the KLF and capturing network traffic if needed. The extracted keys can be later used in a network data mining tool called NetInfoMiner. It is responsible for the extraction of the desired information from the client's network traffic. NetInfoMiner is composed of four data mining engines, the visited links engine, the credential engine, the session cookie engine, and the social network mining engine. All four engines support extracting information from HTTP and HTTPS traffic. In addition to the support for HTTP2 and SPDY in both the credential and cookie engines.

The visited links engine was not properly evaluated due to missing data set and source of true positive, but, it is based on an existing approach (RCI) that claims accuracy of extracting, the visited links between 91-95%.

The evaluation of the credential engine shows that it is able to extract credentials from 65 out of 70 tested web applications. Further testing revealed that the credential engine can generate 6.35% false positives and miss 9.23% false negatives. These results suggest acceptable accuracy in extracting credentials. The false positives are related to some parameter names that match possible parameters known to hold usernames or passwords, while false negatives are related to either parsing issues or unknown implemented login criteria by some web applications The cookie engine showed less accuracy compared to the credential engine. It was able to extract the session cookies from 54 of 70 tested web applications. Further testing revealed that the cookie engine can generate 43.04% false positives and miss 30.77% false negatives. The false positives are mostly related to some advertisement sites that creates session cookies to track users browsing activities. Testing showed that 26.58% of the extracted session cookies are related to advertisement purposes to some fixed sites such as adnxs.com. Possible improvements can be 1) adding a list of known advertisement sites that can be used to filter out their cookies, 2) correlating the results of the session cookie engine with the credential engine, and only extract session cookies of sites that belong to extracted credentials in the same time frame.

The social network engine was implemented to extract common Facebook activities. It's testing shows that it can extract all targeted activities even if they are carried across multiple protocols and browsers. In some cases, some extracted activities cannot be related to a Facebook user ID due to a missing parameter. This issue has not been avoided in the current implementation but it might be overcome by looking for the existence of a Facebook user ID in the same TCP stream that the activity was extracted from.

At last, the key logging feature in its current implementation imposes the risk of exposing users sensitive information. The KLF should not be in plaintext.

Figure 20:
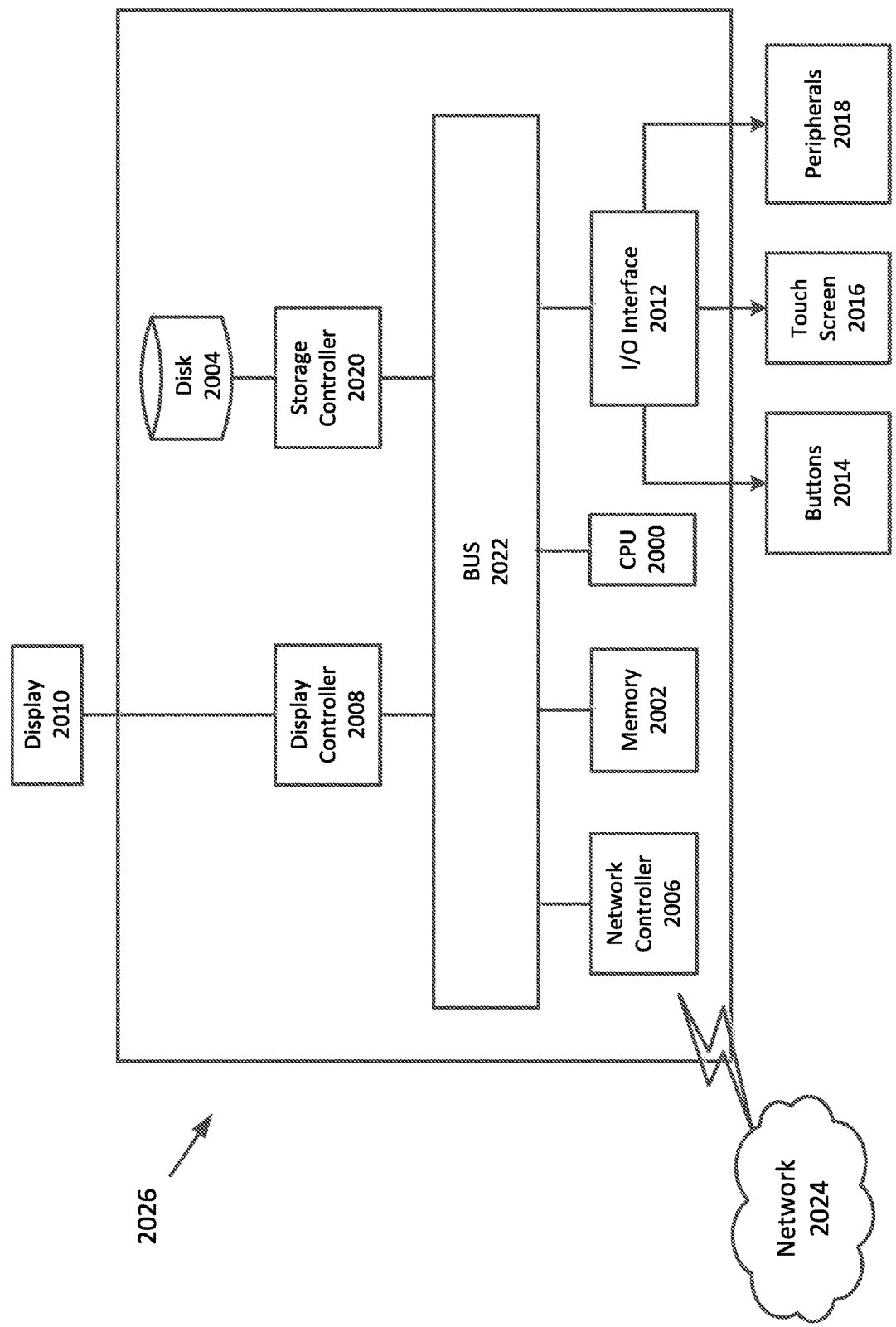
FIG. 20 is a block diagram of a computer system according to an exemplary aspect of the disclosure.

In one implementation, the functions and processes of the remote device 401 or client computer 402 may be implemented by a computer 2026. Next, a hardware description of the computer 2026 according to exemplary embodiments is described with reference to FIG. 20. In FIG. 20, the computer 2026 includes a CPU 2000 which performs the processes described herein. The process data and instructions may be stored in memory 2002. These processes and instructions may also be stored on a storage medium disk 2004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 2026 communicates, such as a server or computer.

Further, the claimed advancements may be provided as a utility application, background daemon, or component of an operating system, or combination thereof, executing in conjunction with CPU 2000 and an operating system such as Microsoft® Windows®, UNIX®, Oracle® Solaris, LINUX®, Apple macOS® and other systems known to those skilled in the art.

In order to achieve the computer 2026, the hardware elements may be realized by various circuitry elements, known to those skilled in the art. For example, CPU 2000 may be a Xenon® or Core® processor from Intel Corporation of America or an Opteron® processor from AMD of America, or may be other processor types that would be recognized by one of ordinary skill in the art. Alternatively, the CPU 2000 may be implemented on an FPGA, ASIC, PLD or using discrete logic circuits, as one of ordinary skill in the art would recognize. Further, CPU 2000 may be implemented as multiple processors cooperatively working in parallel to perform the instructions of the inventive processes described above.

The computer 2026 in FIG. 20 also includes a network controller 2006, such as an Intel Ethernet PRO network interface card from Intel Corporation of America, for interfacing with network 2024. As can be appreciated, the network 2024 can be a public network, such as the Internet, or a private network such as LAN or WAN network, or any combination thereof and can also include PSTN or ISDN sub-networks. The network 2024 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 2026 further includes a display controller 2008, such as a NVIDIA® GeForce® GTX or Quadro® graphics adaptor from NVIDIA Corporation of America for interfacing with display 2010, such as a Hewlett Packard® HPL2445w LCD monitor. A general purpose I/O interface 2012 interfaces with a keyboard and/or mouse 2014 as well as an optional touch screen panel 2016 on or separate from display 2010. General purpose I/O interface also connects to a variety of peripherals 2018 including printers and scanners, such as an OfficeJet® or DeskJet® from Hewlett Packard®.

The general purpose storage controller 2020 connects the storage medium disk 2004 with communication bus 2022, which may be an ISA, EISA, VESA, PCI, or similar, for interconnecting all of the components of the computer 2026. A description of the general features and functionality of the display 2010, keyboard and/or mouse 2014, as well as the display controller 2008, storage controller 2020, network controller 2006, and general purpose I/O interface 2012 is omitted herein for brevity as these features are known.

The invention claimed is:

1. A system for information extraction from network traffic traces that are both encrypted and non-encrypted, the system comprising:
   a client computer configured to set a session key log file environment variable, such that when the client computer launches a supported browser, a session key log file (KLF) is created, capture the computer network traffic traces by retrieving data from encrypted traffic, the encrypted traffic being part of a data exchange over the World Wide Web, and transfer the KLF and captured traffic traces to a remote server; and
   a remote computer performing traffic mining to analyze the captured traffic traces and extract sensitive pieces of information,
   wherein the performing traffic mining includes analyzing the captured traffic traces and identifying potential obfuscated login credentials using heuristics,
   wherein the identifying potential obfuscated login credentials includes:
      detecting a login request by filtering for Post methods, Content-type headers including URL-encoded forms and JSON, and the target URL of the login; and.
      extracting parameters, including username and password parameters, by searching for parameter names that match keywords;
   wherein when the parameter name does not match a keyword, the parameter name will be passed to a heuristic engine to determine how related the parameter is to the respective credential, which is a username or password, and decide whether the parameter is a username, password, or should be ignored, the heuristic engine using a set of low-level heuristics to compute and assign a pair of scores for the parameter indicating how the parameter is related to the respective credential.

2. The system of claim 1, wherein the session key log file environment is SSLKEYLOGFILE and the session KLF is a Transport Layer Security (TLS) session
   wherein the client computer is configured to retrieve data from TLS encrypted traffic as the captured computer network traffic traces and transfer the KLF and the captured traffic traces to the remote server.

3. The system of claim 1, wherein the performing traffic mining includes analyzing the captured traffic traces and extracting sensitive pieces of information, including sequence visited Universal Resource Locators (URLs), session cookies, and Social network activities.

4. The system of claim 3, wherein the performing traffic mining includes extracting pieces of information including a sequence of visited links by a specific client using a specific browser without the client being idle for more than a predetermined period of time.

5. The system of claim 3, wherein the performing traffic mining includes extracting session cookies from set-cookie headers.

6. The system of claim 3, wherein the performing traffic mining includes extracting packets with activities from Hypertext Transfer Protocol (HTTP) requests, comments, reactions, posts creation, post modification, and post deletion.

7. The system of claim 1, wherein the client computer obtains a session key based on user-level privileges.

8. The system of claim 1, wherein the client computer includes:
   an infection vector configured to handle the environment variable and close supported browsers;
   a scheduler configured to create a scheduled task to send the KLF and the captured network traffic traces;
   a transmitter configured to transmit the KLF and the captured traffic traces to the remote server; and
   a sniffer configured to sniff the client's network traffic.

9. A method of information extraction from network traffic traces that are both encrypted and non-encrypted, the method comprising:
   setting a session key log file environment variable, such that when a supported browser is launched, a session key log file (KLF) is created, computer network traffic traces are captured by retrieving data from encrypted traffic. the encrypted traffic being part of a data exchange over the World Wide Web ,and the KLF and the captured traffic traces are transferred to a remote server; and
   performing traffic mining, by the remote server, to analyze the captured traffic traces and extract sensitive pieces of information,
   wherein the perfoiriling traffic mining includes analyzing the captured traffic traces and identifying potential obfuscated login credentials using heuristics,
   wherein the identifying potential obfuscated login credentials includes:
      detecting a login request by filtering for Post methods, Content-type headers including URL-encoded forms and JSON, and the target URL of the login; and
      extracting parameters, including username and password parameters, by searching for parameter names that match keywords;
   wherein when the parameter name does not match a keyword, the parameter name will be passed to a heuristic engine to determine how related the parameter is to the respective credential, which is a username or password, and decide whether the parameter is a username, password, or should be ignored, the heuristic engine using a set of low-level heuristics to compute and assign a pair of scores for the parameter indicating how the parameter is related to the respective credential.

10. The method of claim 9, wherein the session key log file environment is SSLKEYLOGFILE and the session KLF is a Transport Layer Security (TLS) session KLF,
   wherein the method includes retrieving data from TLS encrypted traffic as the captured computer network traffic traces and transferring the KLF and the captured traffic traces to the remote server.

11. The method of claim 9, wherein the performing traffic mining includes analyzing the captured traffic and extracting sensitive pieces of information, including sequence visited Universal Resource Locators (URLs), session cookies, and Social network activities.

12. The method of claim 11, wherein the performing traffic mining includes
   extracting pieces of information including a sequence of visited links by a specific client using a specific browser without the client being idle for more than a predetermined period of time.

13. The method of claim 11, wherein the performing traffic mining includes
   extracting session cookies from set-cookie headers.

14. The method of claim 11, wherein the performing traffic mining includes
   extracting packets with activities from Hypertext Transfer Protocol (HTTP) requests, comments, reactions, posts creation, post modification, and post deletion.

15. The method of claim 9, wherein the method includes obtaining a session key based on user-level privileges.

16. The method of claim 9, wherein the method includes:
   handling the environment variable and closing supported browsers;
   creating a scheduled task to send the KLF and the captured network traffic traces;
   transmitting the KLF and the captured traffic traces to the remote server; and
   sniffing the client's network traffic.

* * * * *